(12) United States Patent (10) Patent No.: US 12,197,700 B2
Chae et al. (45) Date of Patent: Jan. 14, 2025

(54) METHOD OF SELECTING ONE OR MORE ITEMS ACCORDING TO USER INPUT AND ELECTRONIC DEVICE THEREFOR

(71) Applicant: Samsung Electronics Co., Ltd., Gyeonggi-do (KR)

(72) Inventors: Won-Gi Chae, Gyeonggi-do (KR); Do-Yeon Nam, Gyeonggi-do (KR); Jin-Chun Park, Gyeonggi-do (KR); Jae-Wan Seo, Gyeonggi-do (KR); Tae-Ki Hong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 18/144,583

(22) Filed: May 8, 2023

(65) Prior Publication Data

US 2023/0273708 A1 Aug. 31, 2023

Related U.S. Application Data

(63) Continuation of application No. 16/908,176, filed on Jun. 22, 2020, now Pat. No. 11,681,411, which is a
(Continued)

(30) Foreign Application Priority Data

Oct. 31, 2014 (KR) ........................ 10-2014-0150264

(51) Int. Cl.
*G06F 3/04842* (2022.01)
*G06F 3/0482* (2013.01)
(Continued)

(52) U.S. Cl.
CPC ........ *G06F 3/0482* (2013.01); *G06F 3/04842* (2013.01); *G06F 3/0485* (2013.01); *G06F 3/0488* (2013.01); *G06F 2203/04808* (2013.01)

(58) Field of Classification Search
CPC .. G06F 3/0482; G06F 3/04842; G06F 3/0485; G06F 3/0488; G06F 2203/04808
See application file for complete search history.

(56) References Cited

U.S. PATENT DOCUMENTS 7,030,861 B1 4/2006 Westerman
7,705,830 B2 4/2010 Westerman
(Continued)

FOREIGN PATENT DOCUMENTS

EP 2 393 000 12/2011
EP 2 442 224 4/2012
(Continued)

OTHER PUBLICATIONS

European Search Report dated Dec. 17, 2015 issued in counterpart application No. 15165799.6-1959, 8 pages.
(Continued)

*Primary Examiner* — Dino Kujundzic
(74) *Attorney, Agent, or Firm* — The Farrell Law Firm, P.C.

(57) ABSTRACT

A method for selecting one or more items by an electronic device is provided. The method includes, in a scroll mode in which scrolling is performed without thumbnail selection in response to a drag input, displaying a first set of thumbnails among a plurality of thumbnails on a screen by rows and columns while an additional row of thumbnails arranged after the first set of thumbnails is not displayed on the screen, wherein the plurality of thumbnails include the first set of thumbnails and the additional row of thumbnails arranged after the first set of thumbnails; detecting a user input for entering a multiple selection mode; in the multiple selection mode, detecting a first touch input on at least one first thumbnail on a first row of the first set of thumbnails on the screen while displaying the first set of thumbnails and selecting the at least one first thumbnail; in the multiple
(Continued)

selection mode, detecting that the first touch input is on a second row of the first set of thumbnails according to a moving of the first touch input; and in the multiple selection mode, after the first touch input is detected on the second row of the first set of thumbnails, as a response to identifying that a first coordinate value related to the first touch input becomes different from a second coordinate value related to the second row of the first set of thumbnails on the screen according to a moving of the first touch input, selecting all of the thumbnails arranged in the second row of the first set of thumbnails passed over by the first touch input, the all of the thumbnails including at least one touched thumbnail arranged in the second row of the first set of thumbnails, and at least one untouched thumbnail arranged in the second row of the first set of thumbnails, wherein the first coordinate value and the second coordinate value are related to a vertical axis.

19 Claims, 17 Drawing Sheets

Related U.S. Application Data continuation of application No. 14/696,026, filed on Apr. 24, 2015, now abandoned.

(51) Int. Cl.
  *G06F 3/0485* (2022.01)
  *G06F 3/0488* (2022.01)

(56) References Cited

U.S. PATENT DOCUMENTS

| | | | |
|---|---|---|---|
| 7,956,847 B2 | 6/2011 | Christie |
| 8,786,559 B2 | 7/2014 | Hogan |
| 9,891,812 B2 | 2/2018 | Tumwattana |
| 2007/0277126 A1 | 11/2007 | Park |
| 2008/0309644 A1 | 12/2008 | Arimoto |
| 2009/0282332 A1 | 11/2009 | Porat |
| 2010/0039399 A1 | 2/2010 | Kim |
| 2010/0134425 A1 | 6/2010 | Storrusten |
| 2010/0241994 A1 | 9/2010 | Wiley |
| 2011/0300910 A1 | 12/2011 | Chi |
| 2012/0030566 A1 | 2/2012 | Victor |
| 2012/0096393 A1 | 4/2012 | Shim |
| 2012/0096400 A1 | 4/2012 | Cho |
| 2013/0127749 A1 | 5/2013 | Yamamoto et al. |
| 2013/0187860 A1 | 7/2013 | Fredriksson |
| 2013/0227480 A1 | 8/2013 | Kim et al. |
| 2014/0089854 A1 | 3/2014 | Storrusten |
| 2014/0173483 A1 | 6/2014 | Hicks |
| 2015/0074590 A1 | 3/2015 | Rahn |
| 2015/0082217 A1 | 3/2015 | Tumwaltana |
| 2015/0309698 A1* | 10/2015 | Senderek | G06F 3/04842 715/815 |
| 2016/0196043 A1 | 7/2016 | Kim |

FOREIGN PATENT DOCUMENTS

| | | |
|---|---|---|
| EP | 2 613 241 | 7/2013 |
| KR | 10-2014-0092694 | 7/2014 |
| WO | WO 2014/010292 | 1/2014 |

OTHER PUBLICATIONS

European Search Report dated Mar. 14, 2018 issued in counterpart application No. 15165799.6-1221, 9 pages.
European Search Report dated Jul. 16, 2020 issued in counterpart application No. 20166662.5-1203, 8 pages.
Korean Office Action dated Aug. 26, 2020 issued in counterpart application No. 10-2014-0150264, 9 pages.
European Search Report dated May 30, 2022 issued in counterpart application No. 20166662.5-1224, 6 pages.
EP Communication Report dated Nov. 13, 2024 issued in counterpart application No. 20166662.5-1218, 5 pages.

* cited by examiner

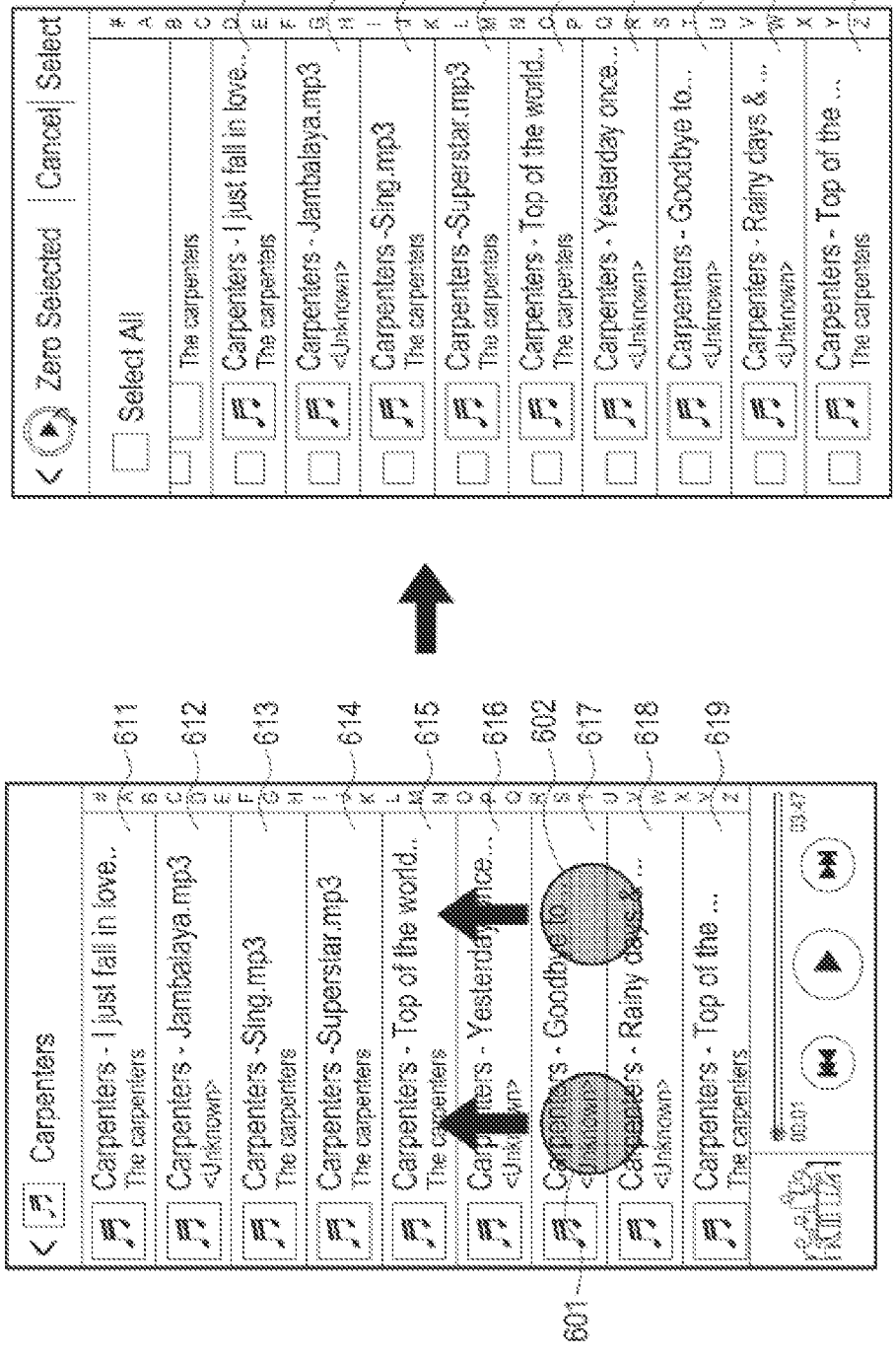

METHOD OF SELECTING ONE OR MORE ITEMS ACCORDING TO USER INPUT AND ELECTRONIC DEVICE THEREFOR

PRIORITY

This application is a Continuation application of U.S. patent application Ser. No. 16/908,176, filed on Jun. 22, 2020, which is a Continuation application of U.S. patent application Ser. No. 14/696,026, filed on Apr. 24, 2015, and is based on and claims priority under 35 U.S.C. § 119(a) to Korean Application Serial No. 10-2014-0150264, which was filed in the Korean Intellectual Property Office on Oct. 31, 2014, the entire content of which is incorporated herein by reference.

BACKGROUND

1. Field of the Invention

The present invention relates, generally, to a method of using an electronic device, and more particularly, to a method of selecting one or more items of an electronic device according to user input.

2. Description of the Related Art

In recent years, supply and use of various portable terminals has rapidly increased with the remarkable development of information and communication technologies and semiconductor technologies. In particular, recent portable terminals have reached a mobile convergence stage of encompassing an area of other terminals without being confined to their own traditional unique areas. Mobile communication terminals now provide various additional functions, such as a TV viewing function (e.g., mobile broadcasting such as Digital Multimedia Broadcasting (DMB) or Digital Video Broadcasting (DVB)), a music reproduction function (e.g., MPEG Audio Layer-3 (MP3)), a photography function, and an Internet access function, in addition to a typical communication function, such as a voice call or message transmission/reception.

Thanks to the various additional functions, terminals provide various types of multimedia content to users so that the type of lists in the terminals is being increased. In addition, it is becoming more important to classify the content or manage the lists in using the terminals.

SUMMARY

Users may want to select two or more items in a list. Typical electronic devices, including portable terminals, support only selecting or deselecting all items. Therefore, when selecting two or more items in the list, the users have to select all desired items on a screen one by one. Therefore, a need exists for a method of selecting one or more items of an electronic device according to user input.

The present invention has been made to address at least the above mentioned problems and/or disadvantages and to provide at least the advantages described below.

Accordingly, an aspect of the present invention is to provide a method of selecting one or more items according to a user input and an electronic device therefore, in which a user can conveniently select one or more items only through simple manipulation.

According to an aspect of the present disclosure, a method for selecting one or more items by an electronic device is provided. The method includes, in a scroll mode in which scrolling is performed without thumbnail selection in response to a drag input, displaying a first set of thumbnails among a plurality of thumbnails on a screen by rows and columns while an additional row of thumbnails arranged after the first set of thumbnails is not displayed on the screen, wherein the plurality of thumbnails include the first set of thumbnails and the additional row of thumbnails arranged after the first set of thumbnails; detecting a user input for entering a multiple selection mode; in the multiple selection mode, detecting a first touch input on at least one first thumbnail on a first row of the first set of thumbnails on the screen while displaying the first set of thumbnails and selecting the at least one first thumbnail; in the multiple selection mode, detecting that the first touch input is on a second row of the first set of thumbnails according to a moving of the first touch input; and in the multiple selection mode, after the first touch input is detected on the second row of the first set of thumbnails, as a response to identifying that a first coordinate value related to the first touch input becomes different from a second coordinate value related to the second row of the first set of thumbnails on the screen according to a moving of the first touch input, selecting all of the thumbnails arranged in the second row of the first set of thumbnails passed over by the first touch input, the all of the thumbnails including at least one touched thumbnail arranged in the second row of the first set of thumbnails, and at least one untouched thumbnail arranged in the second row of the first set of thumbnails, wherein the first coordinate value and the second coordinate value are related to a vertical axis.

According to an aspect of the present disclosure, an electronic device for selecting one or more items is provided. The electronic device includes a display and a processor configured to control the display to, in a scroll mode in which scrolling is performed without thumbnail selection in response to a drag input, display a first set of thumbnails among a plurality of thumbnails on a screen by rows and columns while an additional row of thumbnails arranged after the first set of thumbnails is not displayed on the screen, wherein the plurality of thumbnails include the first set of thumbnails and the additional row of thumbnails arranged after the first set of thumbnails, detect a user input for entering a multiple selection mode, in the multiple selection mode, detect a first touch input on at least one first thumbnail on a first row of the first set of thumbnails on the screen while displaying the first set of thumbnails and select the at least one first thumbnail, in the multiple selection mode, detect that the first touch input is on a second row of the first set of thumbnails according to a moving of the first touch input, and in the multiple selection mode, after the first touch input is detected on the second row of the first set of thumbnails, as a response to identifying that a first coordinate value related to the first touch input is different from a second coordinate value related to the second row of the first set of thumbnails on the screen according to a moving of the first touch input, select all of the thumbnails arranged in the second row of the first set of thumbnails, the all of the thumbnails including at least one touched thumbnail arranged in the second row of the first set of thumbnails, and at least one untouched thumbnail arranged in the second row of the first set of thumbnails, wherein the first coordinate value and the second coordinate value are related to a vertical axis.

According to an aspect of the disclosure, a non-transitory computer-readable storage medium storing commands is provided The commands are configured to be executed by at least one processor to command the at least one processor to perform at least one operation, the at least one operation including, in a scroll mode in which scrolling is performed without thumbnail selection in response to a drag input, displaying a first set of thumbnails among a plurality of thumbnails on a screen by rows and columns while an additional row of thumbnails arranged after the first set of thumbnails is not displayed on the screen, wherein the plurality of thumbnails include the first set of thumbnails and the additional row of thumbnails arranged after the first set of thumbnails; detecting a user input for entering a multiple selection mode; in the multiple selection mode, detecting a first touch input on at least one first thumbnail on a first row of the first set of thumbnails on the screen while displaying the first set of thumbnails and selecting the at least one first thumbnail; in the multiple selection mode, detecting that the first touch input is on a second row of the first set of thumbnails according to a moving of the first touch input; and in the multiple selection mode, after the first touch input is detected on the second row of the first set of thumbnails, as a response to identifying that a first coordinate value related to the first touch input is different from a second coordinate value related to the second row of the first set of thumbnails on the screen according to a moving of the first touch input, selecting all of the thumbnails arranged in the second row of the first set of thumbnails passed over by the first touch input, the all of the thumbnails including at least one touched thumbnail arranged in the second row of the first set of thumbnails, and at least one untouched thumbnail arranged in the second row of the first set of thumbnails, wherein the first coordinate value and the second coordinate value are related to a vertical axis.

BRIEF DESCRIPTION OF THE DRAWINGS

The above and other aspects, features, and advantages of the present invention will be more apparent from the following detailed description taken in conjunction with the accompanying drawings, in which:

FIGS. 5A-5D are diagrams illustrating screens on which an electronic device executes a multi-selection mode, according to an embodiment of the present invention;

FIGS. 6A-6D are diagrams illustrating screens on which an electronic device executes a multi-selection mode, according to an embodiment of the present invention;

DETAILED DESCRIPTION

Figure 1:
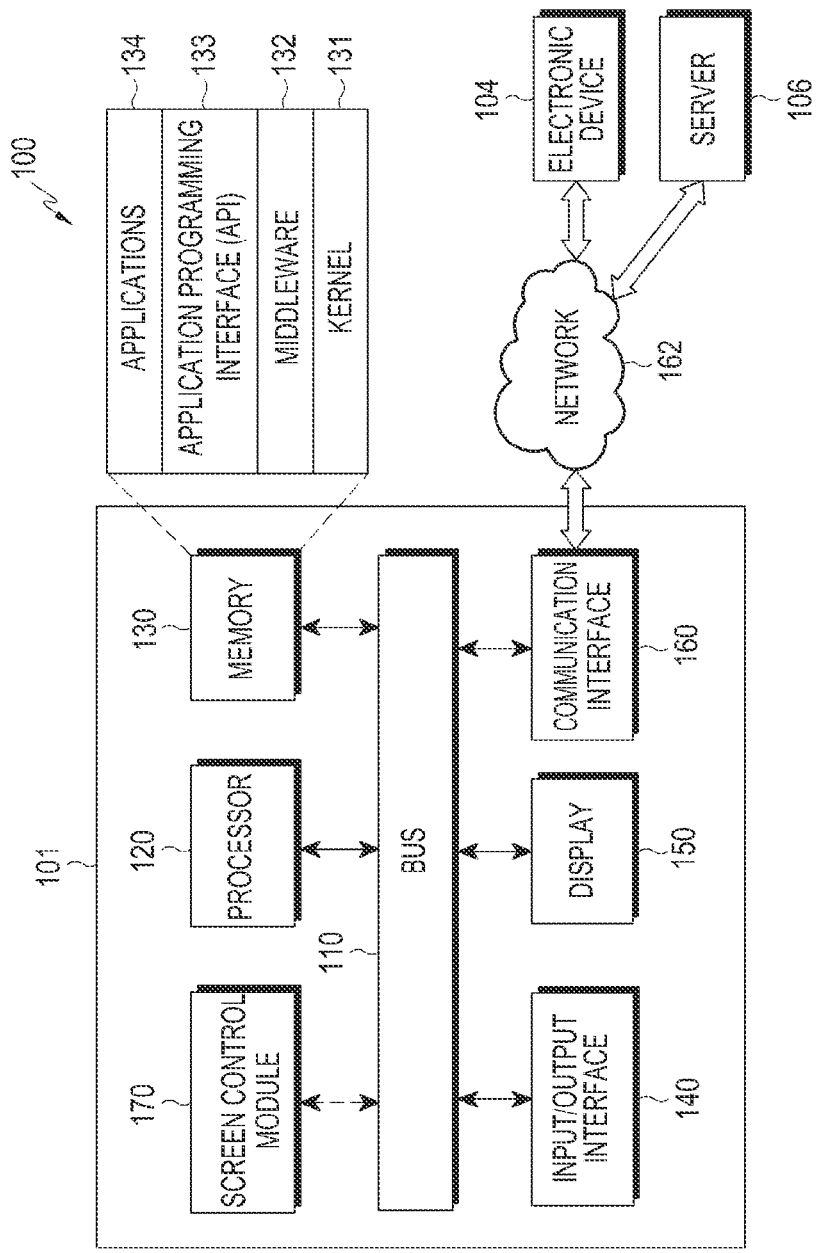
FIG. 1 is a block diagram illustrating a network environment including an electronic device, according to an embodiment of the present invention.

Hereinafter, various embodiments of the present invention will be described with reference to the accompanying drawings. The present invention may be modified in various forms and include various embodiments, but specific examples are illustrated in the drawings and described in the description. However, the description is not intended to limit the present invention to the specific embodiments, and it shall be appreciated that all the changes, equivalents and substitutions belonging to the idea and technical scope of the present invention are included in the present invention. In the description of the drawings, identical or similar reference numerals are used to designate identical or similar elements.

Hereinafter, the terms "include" or "may include", which may be used in various embodiments of the present invention, refer to the presence of disclosed functions, operations or elements, and do not restrict the addition of one or more functions, operations or elements. In the present disclosure, the terms such as "include' or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" in the present disclosure means the inclusion of at least one or all of the disclosed elements. For example, the expression "A or B" may include A, may include B, or may include both A and B.

"The first" or "the second" used in the present disclosure may modify various elements of embodiments, and not restrict the corresponding elements. For example, the above expressions do not limit the sequence and/or importance of the corresponding elements. The expressions may be used to distinguish a component element from another component element. For example, a first user device and a second user device indicate different user devices although both of them are user devices. For example, without departing from the scope of the present invention, a first component element may be referred to as a second component element. Similarly, the second component element also may be referred to as the first component element.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly" to another component element, it may be construed that a third component element does not exist between the first component element and the second component element.

In the present disclosure, the terms are used to describe specific embodiments, and are not intended to limit the present invention. As used herein, the singular forms are intended to include the plural forms as well, unless the context clearly indicates otherwise.

Unless defined differently, all terms used herein, which include technical terminologies or scientific terminologies, have the same meaning as understood by a person skilled in the art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to embodiments of the present invention may be a device with a display function or a communication function. For example, the electronic devices may include at least one of smart phones, tablet personal computers (PCs), mobile phones, video phones, e-book readers, desktop PCs, laptop PCs, netbook computers, personal digital assistants (PDAs), portable multimedia players (PMPs), MP3 players, mobile medical devices, cameras, wearable devices (e.g., head-mounted-devices (HMDs) such as electronic glasses), electronic clothes, electronic bracelets, electronic necklaces, electronic appcessories, electronic tattoos, or smart watches.

The electronic device may be a smart home appliance with a display function or a communication function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

The electronic device may include at least one of various medical devices such as a magnetic resonance angiography (MRA) scanner, a magnetic resonance imaging (MRI) scanner, a computed tomography (CT) scanner, a scanner, an ultrasonograph, or the like, a navigation device, a Global Positioning System (GPS) receiver, an Event Data Recoder (EDR), a Flight Data Recorder (FDR), a vehicle infotainment device, an electronic equipment for ship (for example a ship navigation device and gyro-compass and the like, avionics, a security device, a head unit for vehicle, an industrial or household robot, ATM (automatic teller machine) in banking facilities or POS (point of sales) in stores.

The electronic device may include at least one of a part of furniture or a building/structure having a display control function, an electronic board, an electronic signature receiving device, a projector, and various kinds of measuring instruments (e.g., a water meter, an electric meter, a gas meter, a radio wave meter, and the like). The electronic device may be a combination of one or more of above described various devices. Also, the electronic device may be a flexible device. Also, the electronic device is not limited to the above described devices.

Hereinafter, the electronic device will be described with reference to the accompanying drawings. In various embodiments, the term "user" may indicate a person using an electronic device or a device (e.g. an artificial intelligence electronic device) using an electronic device.

FIG. 1 is a block diagram illustrating a network environment including an electronic device, according to an embodiment of the present invention.

Referring to FIG. 1, the electronic device 101 includes a bus 110, a processor 120, a memory 130, an input/output interface 140, a display 150, a communication interface 160, and a screen control module 170.

The bus 110 may be a circuit for connecting the aforementioned elements with each other and transferring communication (e.g., a control messages) among the aforementioned elements.

The processor 120 receives instructions from the aforementioned other elements (e.g., the memory 130, the input/output interface 140, the display 150, the communication interface 160, and the screen control module 170) through, for example, the bus 110, decodes the received instructions, and performs calculation or data processing according to the decoded instructions.

The memory 130 stores instructions or data received from or generated by the processor 120 or the other elements (e.g., the input/output interface 140, the display 150, the communication interface 160, and the screen control module 170). The memory 130 includes programming modules such as a kernel 131, a middleware 132, an Application Programming Interface (API) 133, and applications 134. Each of the aforementioned programming modules may be formed of software, firmware, hardware, or a combination of at least two thereof.

The memory 130 stores items displayed through the display 150 (e.g., icons corresponding to applications and images or icons corresponding thereto).

The kernel 131 controls or manages system resources (e.g., the bus 110, the processor 120, and the memory 130) which are used to perform operations or functions implemented by the rest of the programming modules, for example, the middleware 132, the API 133 or the applications 134. In addition, the kernel 131 may provide an interface through which the middleware 132, the API 133, or the applications 134 may access the individual elements of the electronic device 101 to control or manage them.

The middleware 132 serves as an intermediary such that the API 133 or the applications 134 communicate with the kernel 131 to transfer data. Furthermore, in response to requests for work received from the applications 134, the middleware 132 performs a control (e.g., scheduling or load-balancing) for the work requests, using a method of assigning priorities for use of a system resource (e.g., the bus 110, the processor 120, or the memory 130) of the electronic device 101 to at least one of the applications 134.

The API 133 is an interface by which the applications 134 control functions provided from the kernel 131 or the middleware 132 and for example, may include at least one interface or function (e.g., instruction) for file control, window control, image processing, text control, or the like.

The applications 134 may include a Short Message Service (SMS)/Multimedia Message Service (MMS) application, an e-mail application, a calendar application, an alarm application, a health care application (e.g., an application for measuring a work rate or a blood sugar), and an environment information application (e.g., an application for providing atmospheric pressure, humidity, or temperature information). Additionally or alternatively, the applications 134 may be an application related to an exchange of information between the electronic device 101 and an external electronic device (e.g., an electronic device 104). The application related to information exchange may include, for example, a notification relay application for transferring particular information to the external electronic device or a device management application for managing the external electronic device.

For example, the notification relay application may include a function of transferring notification information generated in the other applications (e.g., the SMS/MMS application, the e-mail application, the health care application, or the environmental information application) of the electronic device 101 to the external electronic device (for example, the electronic device 104). Additionally or alternatively, the notification relay application may receive notification information from, for example, the external electronic device (e.g., the electronic device 104) and provide the same to a user. For example, the device management application may manage (e.g., install, delete, or update) at least some functions (e.g., turning the external electronic device (or some elements) on/off or adjusting the brightness (or resolution) of a display) of the external electronic device (e.g., the electronic device 104) that communicates with the electronic device 101, applications performed in the external electronic device, or services (e.g., a phone call service or a messaging service) provided by the external electronic device.

The applications 134 may include applications designated depending upon attributes (e.g., the type of electronic device) of the external electronic device (e.g., the electronic device 104). For example, in a case where the external electronic device is an MP3 player, the applications 134 may include an application related to reproduction of music. Similarly, when the external electronic device is a mobile medical device, the application 134 may include an application related to health care. The applications 134 may include at least one of the applications designated in the electronic device 101 or applications received from the external electronic device (e.g., a server 106 or the electronic device 104).

The input/output interface 140 transfers instructions or data, input by a user through an input/output device (e.g., a sensor, a keyboard, or a touch screen), to the processor 120, the memory 130, the communication interface 160, or the screen control module 170 through, for example, the bus 110. For example, the input/output interface 140 provides, to the processor 120, data for a user's touch input through the touch screen. In addition, the input/output interface 140 outputs, through the input/output device (e.g., a speaker or a display), the instructions or data received from the processor 120, the memory 130, the communication interface 160, or the display control module 170 through the bus 110. For example, the input/output interface 140 outputs voice data processed by the processor 120 to a user through the speaker.

The input/output interface 140 receives a user input for executing a multi-selection mode or a user input for selecting one or more items. For example, through the microphone included in the input/output interface 140, a user may input voice as the user input for executing a multi-selection mode or the user input for selecting one or more items. In addition, through the microphone included in the input/output interface 140, the user may press a button provided in the electronic device 101 or one or more buttons included in the keypad as the user input for executing a multi-selection mode or the user input for selecting one or more items. The keypad may include a virtual keypad. In this case, through a camera lens included in the input/output interface 140, the user may also input a gesture as the user input for executing a multi-selection mode or the user input for selecting one or more items.

The display 150 displays various pieces of information (e.g., multimedia data or text data) for a user. The display 150 displays one or more items. In addition, the display unit 150 displays a multi-selection screen when the electronic device 101 is switched to the multi-selection mode. A user may select one or more items through the multi-selection screen. The one or more items and a selection box for representing whether the corresponding item is selected may be displayed on the multi-selection screen.

The communication interface 160 connects communication between the electronic device 101 and the external device (e.g., the electronic device 104 or the server 106). For example, the communication interface 160 communicates with the external electronic device while being connected to a network 162 through wireless or wired communication. The wireless communication may include at least one of, for example, Wireless Fidelity (Wi-Fi), Bluetooth® (BT), Near Field Communication (NFC), Global Positioning System (GPS), and cellular communication (e.g., LTE, LTE-A, CDMA, WCDMA, UMTS, WiBro, or GSM). The wired communication may include at least one of, for example, a Universal Serial Bus (USB), a High Definition Multimedia Interface (HDMI), Recommended Standard 232 (RS-232), and a Plain Old Telephone Service (POTS).

The network 162 may be a telecommunication network. The communication network may include at least one of a computer network, the Internet, the Internet of Things, and a telephone network. A protocol (e.g., a transport lay protocol, a data link layer protocol, or a physical layer protocol) for communication between the electronic device 101 and the external device may be supported by at least one of the applications 134, the application programming interface 133, the middleware 132, the kernel 131, and the communication interface 160.

The screen control module 170 processes at least some information acquired from the other elements (e.g., the processor 120, the memory 130, the input/output interface 140, and the communication interface 160) and provides the processed information to a user through various methods. For example, using the processor 120 or independently therefrom, the screen control module 170 controls at least some functions of the electronic device 101 such that the electronic device 101 may interwork with the other electronic devices (e.g., the electronic device 104 or the server 106). Additional information on the display control module 170 will be described in conjunction with FIGS. 210B, descriptions of which will be given below.

The screen control module 170 executes the multi-selection mode. As described above, the multi-selection mode is an operating mode in which a user selects one or more items displayed on the display 150. The screen control module 170 determines whether a user input for executing the multi-selection mode has been received and executes the multi-selection mode when it is determined that the user input for executing the multi-selection mode has been received.

When the multi-selection mode is executed, the screen control module 170 determines items selected, depending upon the user input. In this case, the user input may be continuously input for selecting a plurality of items at one time. The screen control module 170 determines items selected depending upon the continuous user input and displays the one or more selected items on a screen through the display 150.

Figure 2:
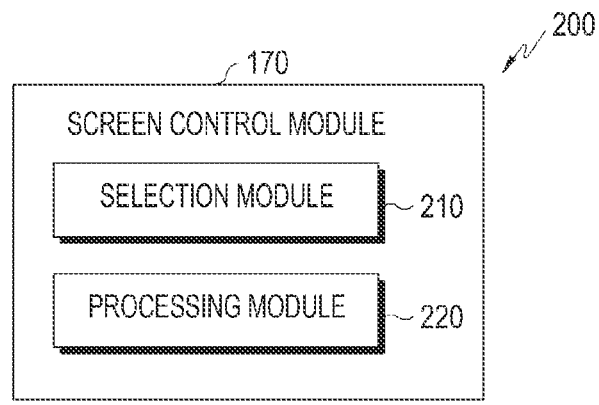
FIG. 2 is a block diagram of a screen control module of an electronic device, according to an embodiment of the present invention.

FIG. 2 is a block diagram of the screen control module 170 of the electronic device 101, according to an embodiment of the present invention.

Referring to FIG. 2, the screen control module 170 includes at least one of a selection module 210 and a processing module 220.

When a multi-selection mode is executed, the selection module 210 determines one or more items selected depending upon a continuous user input.

The processing module 220 processes the one or more items selected depending upon the user input. For example, the processing module 220 copies or deletes the items. In addition, the processing module 220 controls the display 150 to display, on a screen, the operation of processing the items. For example, the processing module 220 controls the display 150 to display the operation of copying or deleting the items.

According to an aspect of the present invention, an electronic device for selecting one or more items includes a display configured to receive a first input on a screen; and a processor configured to: in response to the first input, execute a multi-selection mode for selecting one or more items, and if a second input which is inputted in succession to the first input is received through the display, select the one or more items in response to the second input.

Figure 3:
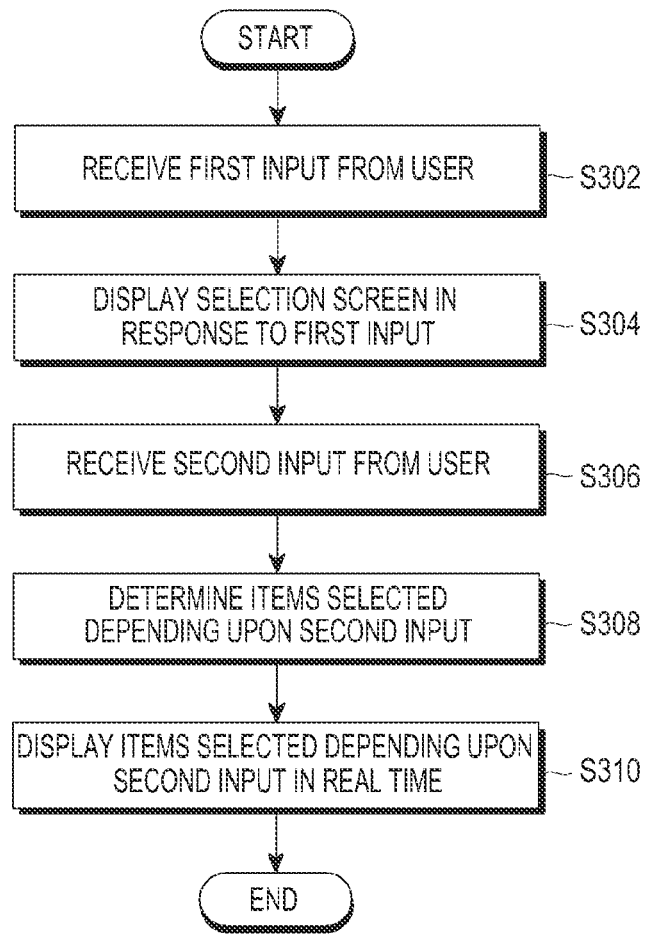
FIG. 3 is a flowchart illustrating a method of selecting one or more items by an electronic device, according to an embodiment of the present invention.

FIG. 3 is a flowchart illustrating a method of selecting one or more items by an electronic device (e.g., the electronic device 101), according to an embodiment of the present invention.

Referring to FIG. 3, the electronic device 101 receives a first input from a user through the display 150 at step S302. The first input, which may be a user input for executing a multi-selection mode, may be a continuous motion input by the user.

When receiving the first input, the screen control module 170 controls the display 150 to display a multi-selection screen in response to the first input at step S304. The multi-selection screen is a screen for allowing the user to select one or more items displayed thereon. For example, on the multi-selection screen, a selection box corresponding to each of the items may be displayed on the left or right side of the item or on the item. As the multi-selection screen is displayed as described above, the user can intuitively recognize that the display 150 has been switched to the multi-selection screen for selecting one or more items.

The electronic device 101 receives a second input, subsequent to the first input, from the user at step S306. The second input may be a continuous user input following the first input. For example, if the first input is a user input for selecting an arbitrary point on a screen, the second input may be a scroll input for moving the screen upwards or downwards with respect to the arbitrary point.

The screen control module 170 determines one or more items selected depending upon the second input at step S308. The screen control module 170 determines the items selected depending upon the second input in consideration of coordinates of the second input on the screen.

When the items selected depending upon the second input are determined, the screen control module 170 controls the display 150 to display, in real time, that the items have been selected according to the second input at step S310. For example, when the user selects first to tenth items through the second input, the screen control module 170 displays the selected first to tenth items such that the first to tenth items are distinguished from the unselected items. At this time, the screen control module 170 controls the display 150 to check only the selection boxes displayed on the left or right side of the first to tenth items so that the first to tenth items selected depending upon the second input can be distinguished from the unselected items.

Figure 4:
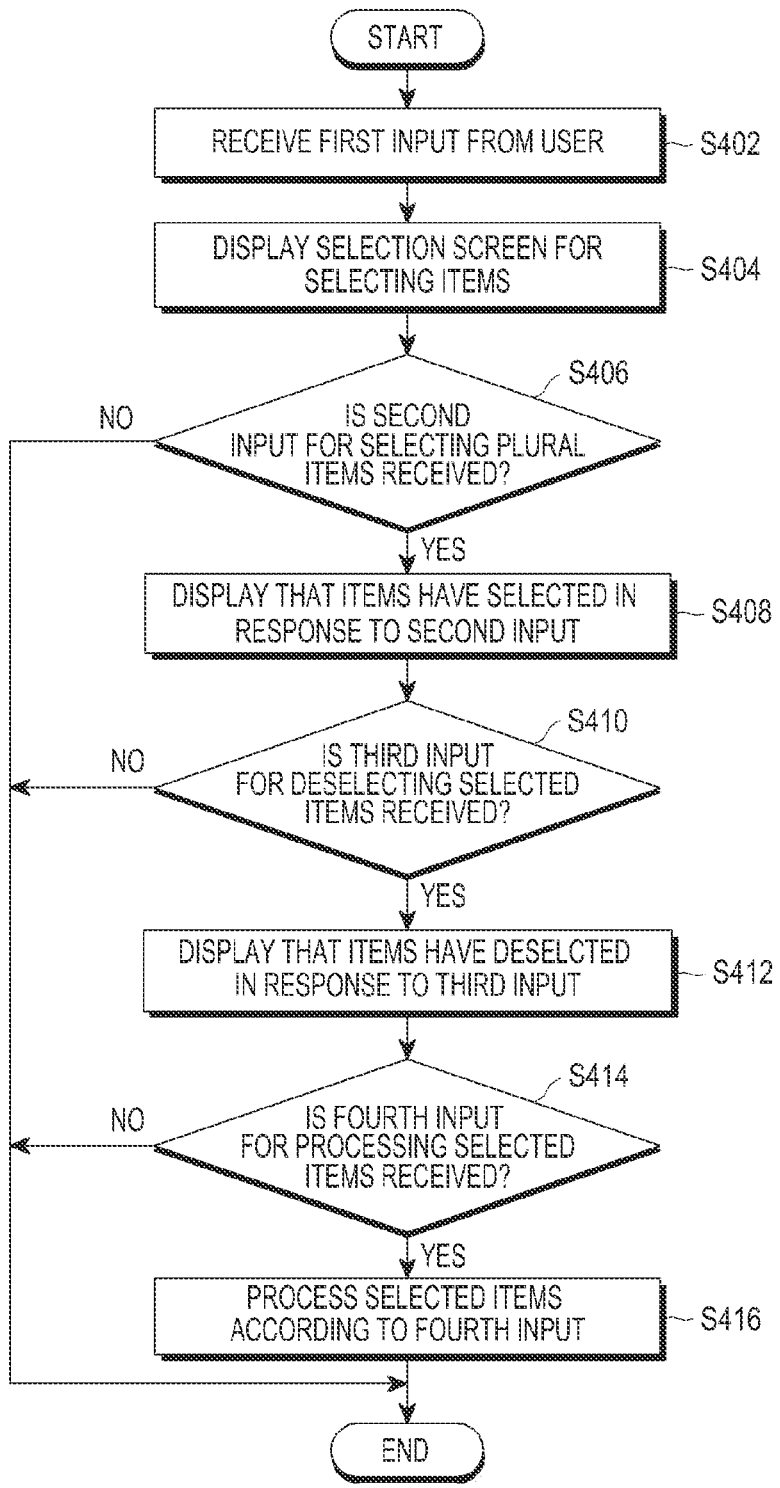
FIG. 4 is a flowchart illustrating a method of selecting one or more items by an electronic device, according to an embodiment of the present invention.

FIG. 4 is a flowchart illustrating a method of selecting one or more items by an electronic device (e.g., the electronic device 101), according to an embodiment of the present invention.

Referring to FIG. 4, the electronic device 101 receives a first input from a user at step S402. The first input received in step S402 may be a user input for executing a multi-selection mode. The multi-selection mode is assumed to correspond to an operating mode for enabling the user to select a plurality of items at one time.

The screen control module 170 of the electronic device 101 controls the display 150 to display a multi-selection screen for selecting items at step S404. When the multi-selection screen is displayed, the screen control module 170 determines whether a second input for selecting a plurality of items has been received from the user at step S406. In this case, the second input may be a continuous user input subsequent to the first input. For example, if the first input is a touch input entered through two arbitrary points on a screen, the second input may be a scroll input for moving the touch input upwards and downwards or leftwards and rightwards. In addition, when the first input is a first gesture input through a camera lens, the second input may be a second gesture subsequently input after the first gesture.

When the determination result at step S406 shows that the second input for selecting a plurality of items has not been received from the user (e.g., no at step S406), the screen control module 170 maintains the current state of displaying the multi-selection screen, without performing separate operations.

When the determination result at step S406 shows that the second input for selecting a plurality of items has been received from the user (e.g., yes at step S406), the screen control module 170 controls the display 150 to display that the plurality of items have been selected depending upon the second input at step S408. The display 150 may distinguishably display the items selected depending upon the second input and the unselected items under control of the screen control module 170.

The screen control module 170 determines whether a third input for deselecting items has been received from the user at step S410. For example, at step S410, when the second input is assumed to be a scroll input for scrolling down a screen while two arbitrary points on the screen are selected, the third input may be a scroll input for scrolling up the screen while two arbitrary points on the screen are selected. The third input may be continuously input after the second input.

When the determination result at step S410 shows that the third input for deselecting items has been received from the user (e.g., yes at step S410), the screen control module 170 controls the display 150 to display that one or more items among the selected items has been deselected depending upon the third input at step S412. For example, at step S412, the screen control module 170 unchecks the selection boxes corresponding to the deselected items. The unchecked boxes mean that the items corresponding thereto are not selected.

Thereafter, the screen control module 170 determines whether a fourth input for processing the selected items has been received from the user at step S414. When it is determined that the fourth input for processing the selected items has been received from the user (yes at step S414), the screen control module 170 processes the selected items according to the fourth input at step S416. For example, the fourth input may be a user input for moving, copying, or deleting the selected items. The screen control module 170 moves, copies, or deletes the selected items according to the fourth input. The fourth input may be an input for other operations except for the operation of moving, copying, or deleting the items, for example, an operation of executing applications corresponding to items, an operation of deleting applications corresponding to items, and an operation of classifying the items as one category by storing them in one folder.

When the determination result at step S416 shows that the fourth input has not been received from the user (no at step S416), the screen control module 170 maintains the current state, without performing separate operations.

When the determination result at step S410 shows that the third input for deselecting items has been not received from the user (no at step S410), the screen control module 170 maintains the current state of displaying the multi-selection screen, without performing separate operations. When the third input has not been received, the screen control module 170 also determines whether the fourth input for processing the selected items has been received from the user at step S414.

According to an aspect of the present invention, a method for selecting one or more items by an electronic device includes receiving a first input for selecting two more points on a screen; in response to the first input, executing a multi-selection mode for selecting one or more items; receiving a second input which is inputted in succession to the first input; and in response to the second input, selecting the one or more items.

FIGS. 5A-5D are diagrams illustrating screens on which an electronic device (e.g., the electronic device 101) executes a multi-selection mode, according to an embodiment of the present invention.

Figures 5A, 5B:
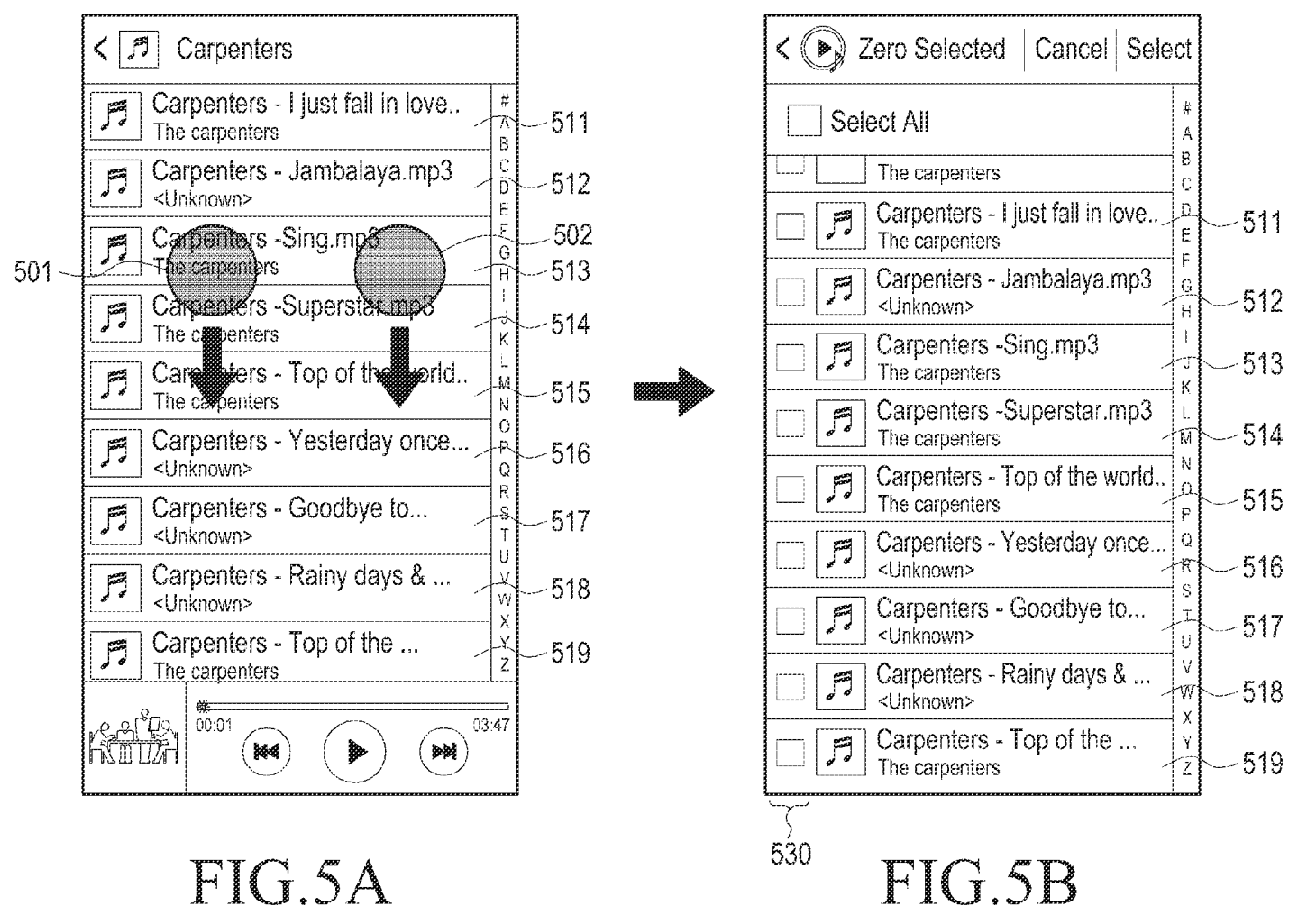

FIG. 5A illustrates a screen through which a user input for executing a multi-selection mode is entered, and FIG. 5B illustrates a screen on which the multi-selection mode is executed. Referring to FIGS. 5A and 5B, the display 150 displays a song list including first to ninth songs 511 to 519.

In addition, referring to FIG. 5A, the display 150 of the electronic device 101 receives a user input for executing a multi-selection mode. For example, a user may enter, into the electronic device 101, a touch input or a hovering input corresponding to an operation of dragging two arbitrary points 501 and 502 on the display 150 downwards while the two points 501 and 502 are selected.

FIG. 5B illustrates a screen on which the multi-selection mode is executed according to the user input entered into the electronic device 101, as illustrated in FIG. 5A. As illustrated in FIG. 5B, the screen control module 170 controls the display 150 to display selection boxes 530 on the left side of the first to ninth songs 511 to 519.

Figures 5C, 5D:
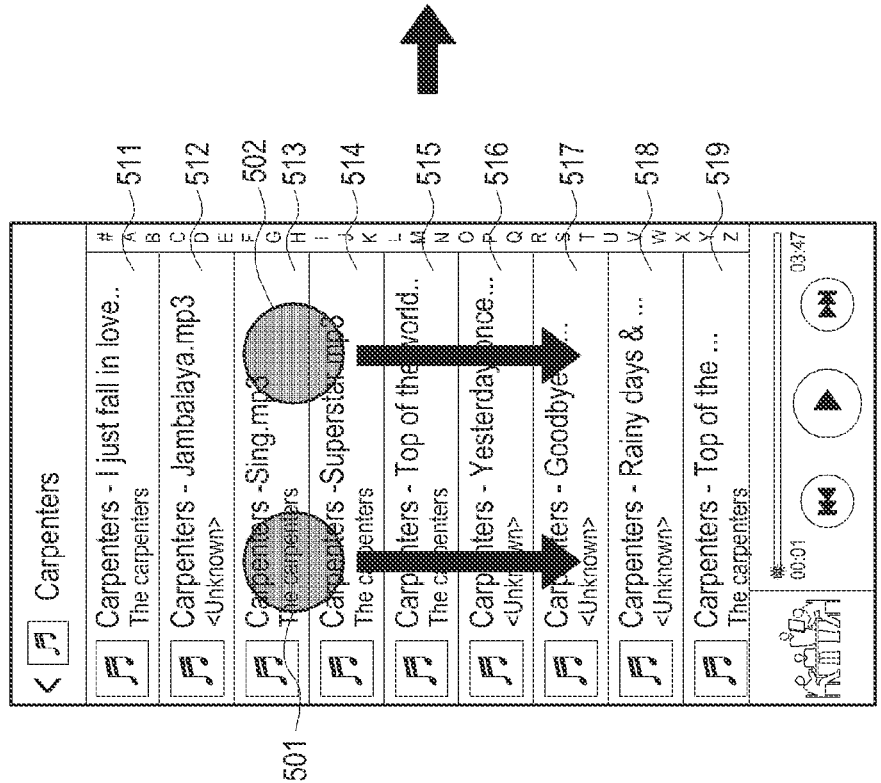

FIGS. 5C and 5D illustrate screens displayed on the display 150 of the electronic device 101 which executes the multi-selection mode, as illustrated in FIGS. 5A and 5B.

When the multi-selection mode is executed, the display 150 of the electronic device 101 receives, from the user, a user input for selecting a plurality of items contained in the list. FIG. 5C illustrates that the electronic device 101 receives the user input for selecting the plurality of items from the user. In this case, the user input illustrated in FIG. 5C is the same as that illustrated in FIG. 5A and may correspond to an operation of scrolling two selected points 501 and 502 on the display 150 downwards.

FIG. 5D illustrates that one or more items are selected according to the user input illustrated in FIG. 5C. The user input illustrated in FIG. 5C starts at the two points 501 and 502 on the third song 513 and stops at two points on the seventh song 517. The screen control module 170 selects all the items over which the user input has passed. Referring to FIG. 5D, the electronic device 101 displays the selected third to seventh songs 513 to 517 which correspond to all the items over which the user input illustrated in FIG. 5C has passed.

As illustrated in FIG. 5D, the screen control module 170 controls the display 150 to check only the selection boxes corresponding to the selected items (e.g., the third to seventh songs 513 to 517) among the selection boxes 530. Therefore, the user using the electronic device 101 can intuitively distinguish between the user-selected items and the unselected items.

FIGS. 6A-6D are diagrams illustrating screens on which an electronic device (e.g., the electronic device 101) executes a multi-selection mode, according to an embodiment of the present invention.

FIG. 6A illustrates a screen through which a user input for executing a multi-selection mode is entered, and FIG. 6B illustrates a screen on which the multi-selection mode is executed. Referring to FIG. 6A and FIG. 6B, the display 150 displays a song list including first to ninth songs 611 to 619.

In addition, referring to FIG. 6A, the display 150 of the electronic device 101 receives a user input for executing a multi-selection mode. For example, a user may enter, into the electronic device 101, a touch input or a hovering input corresponding to an operation of scrolling a screen upwards while arbitrary two points 601 and 602 on the display 150 are selected.

FIG. 6B illustrates a screen on which the multi-selection mode is executed according to the user input entered into the electronic device 101, as illustrated in FIG. 6A. As illustrated in FIG. 6B, the screen control module 170 controls the display 150 to display selection boxes 630 on the left side of the first to ninth songs 611 to 619.

Figures 6C, 6D:
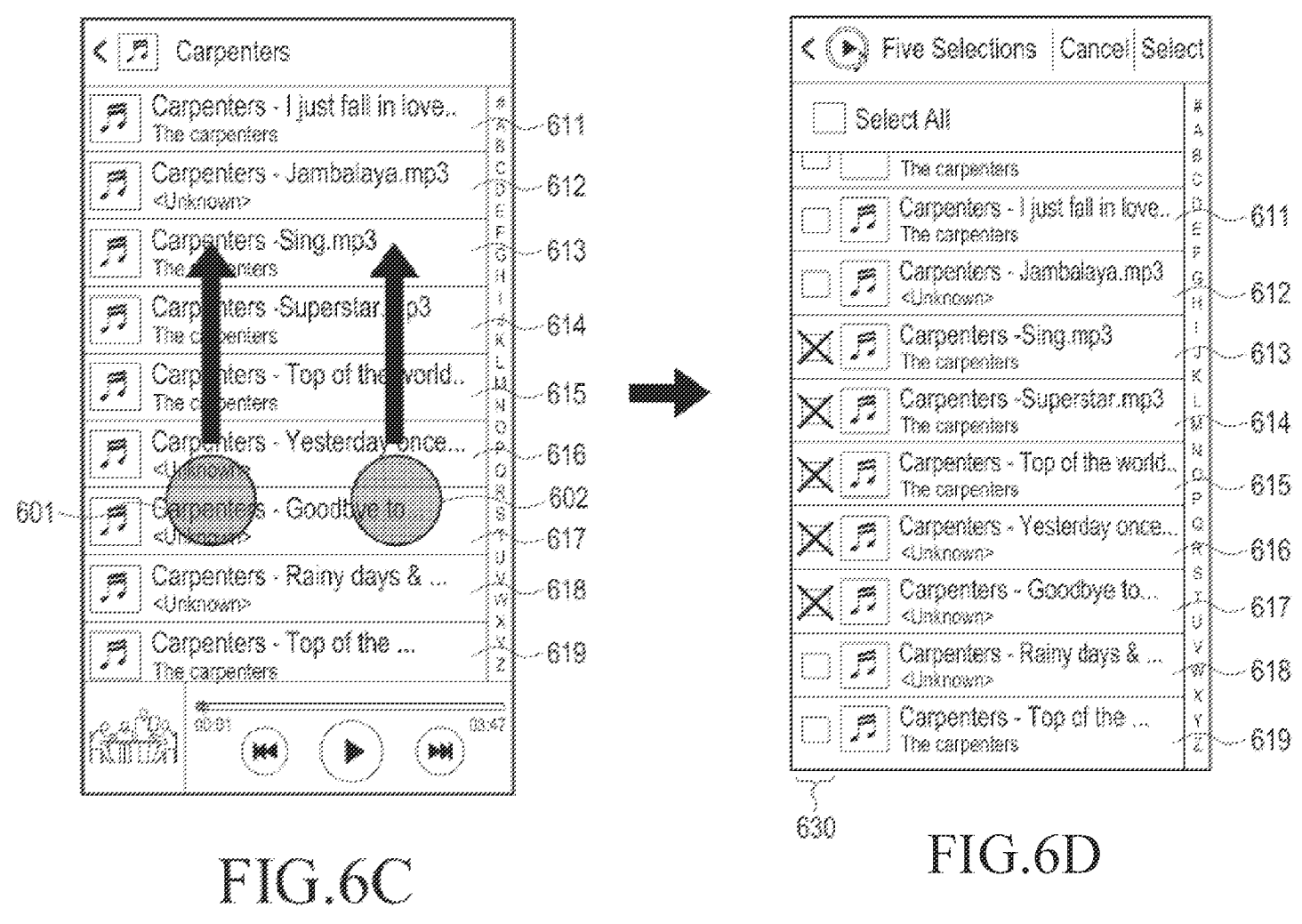

FIGS. 6C and 6D illustrate screens displayed on the display 150 of the electronic device 101 which executes the multi-selection mode, as illustrated in FIGS. 6A and 6B.

When the multi-selection mode is executed, the display 150 of the electronic device 101 receives, from the user, a user input for selecting a plurality of items contained in the list. FIG. 6C illustrates that the electronic device 101 receives the user input for selecting the plurality of items from the user. In this case, the user input illustrated in FIG. 6C is the same as that illustrated in FIG. 6A and may correspond to an operation of scrolling two selected points 601 and 602 on the display 150 upwards.

FIG. 6D illustrates that one or more items are selected according to the user input illustrated in FIG. 6C. The user input illustrated in FIG. 6C starts at the two points 601 and 602 on the seventh song 617 and stops at two points on the third song 613. The screen control module 170 may select all the items over which the user input has passed. Referring to FIG. 6D, the electronic device 101 displays the selected third to seventh songs 613 to 617 which correspond to all the items over which the user input illustrated in FIG. 6C has passed.

As illustrated in FIG. 6D, the screen control module 170 controls the display 150 to check only the selection boxes corresponding to the selected items (e.g., the third to seventh songs 613 to 617) among the selection boxes 630. Therefore, the user using the electronic device 101 can intuitively distinguish between the user-selected items and the unselected items.

Figure 7A:
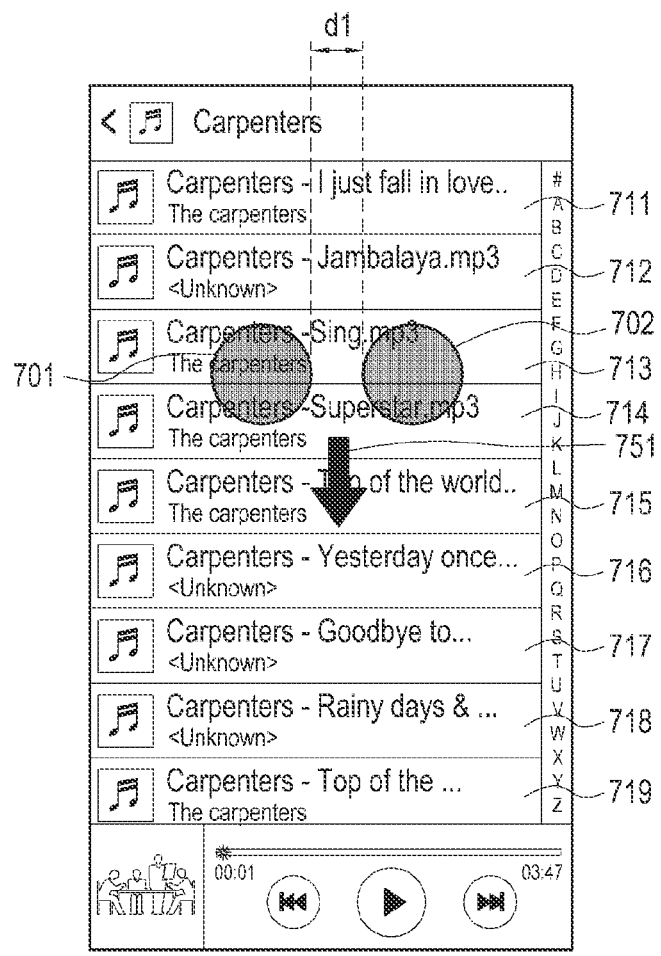
FIGS. 7A and 7B are diagrams illustrating screens on which an electronic device executes a multi-selection mode, according to an embodiment of the present invention.
Figure 7B:
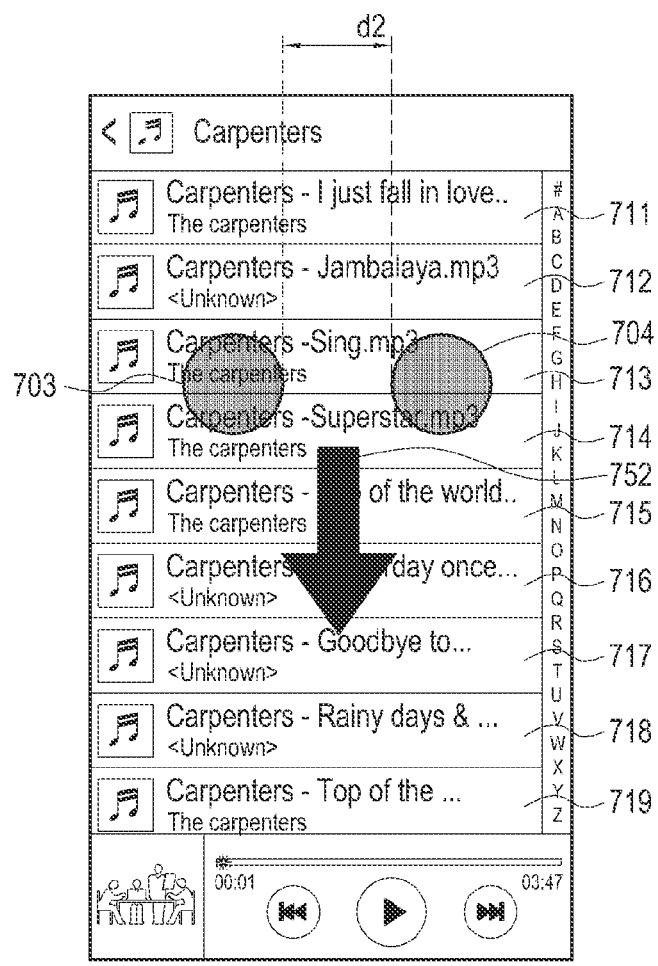

FIGS. 7A and 7B are diagrams illustrating screens on which an electronic device (e.g., the electronic device 101) executes a multi-selection mode, according to an embodiment of the present invention.

Referring to FIGS. 7A and 7B, the display 150 displays a song list including first to ninth songs 711 to 719. FIGS. 7A and 7B illustrate that the display 150 of the electronic device 101 receives a user input for executing a multi-selection mode. As illustrated in FIGS. 7A and 7B, a user may enter, into the electronic device 101, a touch input or a hovering input corresponding to an operation of scrolling a screen downwards while two arbitrary points 701 and 702 or 703 and 704 on the display 150 are selected.

In addition, arrows 751 and 752 illustrated in FIGS. 7A and 7B represent speeds at which the song list is scrolled. The distance d1 between the two arbitrary points 701 and 702 at which the user input is entered in FIG. 7A is shorter than the distance d2 between the two arbitrary points 703 and 704 at which the user input is entered in FIG. 7B. The speed at which the list having the items listed therein is scrolled may be proportional to the distance d1 between the two points 701 and 702 or the distance d2 between the two points 703 and 704. For example, a speed 752 at which the song list in FIG. 7B is scrolled downwards may be higher than a speed 751 at which the song list in FIG. 7A is scrolled downwards. The user may control the speed at which the song list is scrolled, by regulating the distance d1 between the two points 701 and 702 or the distance d2 between the two points 703 and 704.

Although the speed at which the list having the items listed therein is scrolled is proportional to the distance d1 between the two points 701 and 702 or the distance d2 between the two points 703 and 704 in FIGS. 7A and 7B, the speed at which the list is scrolled may also be inversely proportional to the distance d1 between the two points 701 and 702 or the distance d2 between the two points 703 and 704. The screen control module 170 controls the speed at which the list is scrolled, namely, the scroll speed in real time, depending upon the distance d1 between the two points 701 and 702 or the distance d2 between the two points 703 and 704. For example, when the distance d1 between the two points 701 and 702 or the distance d2 between the two points 703 and 704 is increased, the scroll speed may be increased, and when the distance d1 between the two points 701 and 702 or the distance d2 between the two points 703 and 704 is decreased, the scroll speed may be decreased. In another example, when the distance d1 between the two points 701 and 702 or the distance d2 between the two points 703 and 704 is increased, the scroll speed may also be decreased, and when the distance d1 between the two points 701 and 702 or the distance d2 between the two points 703 and 704 is decreased, the scroll speed may also be increased.

FIGS. 8A-8H are diagrams illustrating screens on which an electronic device (e.g., the electronic device 101) executes a multi-selection mode, according to an embodiment of the present invention. Although FIGS. 8A-8H are illustrated, operations of the electronic device 101 may be performed in order of FIGS. 8A to 8H.

Figures 8A, 8B:
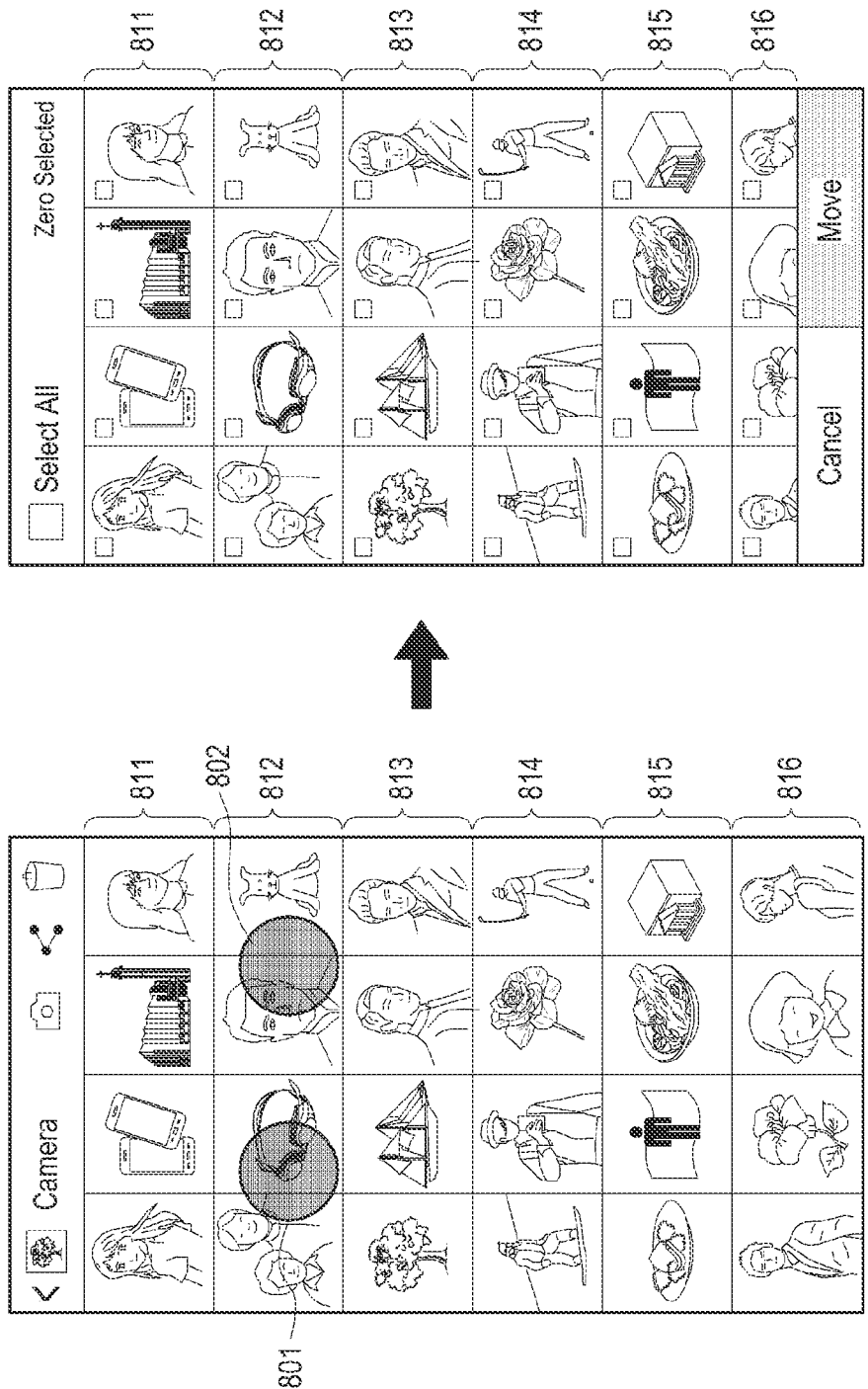
FIGS. 8A-8H are diagrams illustrating screens on which an electronic device executes a multi-selection mode, according to an embodiment of the present invention.

FIG. 8A illustrates a screen through which a user input for executing a multi-selection mode is entered, and FIG. 8B illustrates a screen on which the multi-selection mode is executed. Referring to FIGS. 8A and 8B, the display 150 displays a gallery containing images or icons corresponding thereto. There are four images in each of rows 811 to 818 in the gallery illustrated in FIGS. 8A to 8H.

Referring to FIG. 8A, the display 150 of the electronic device 101 receives a user input for executing a multi-selection mode. For example, a user may enter, into the electronic device 101, a touch input or a hovering input for selecting two arbitrary points 801 and 802 on the display 150.

FIG. 8B illustrates a screen switched to a multi-selection mode according to the user input illustrated in FIG. 8A. When the screen is switched to the multi-selection mode, selection boxes may be displayed on images.

Figure 8D:
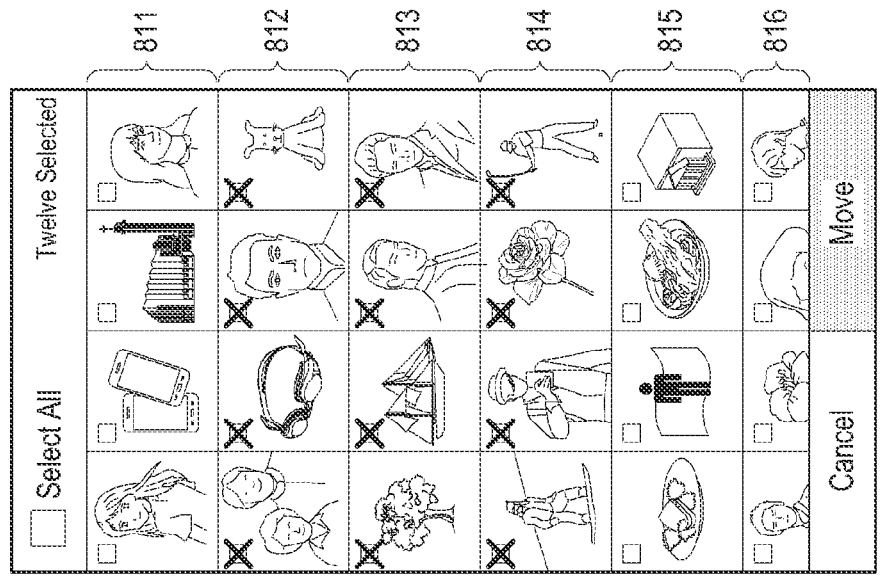
Figure 8C:
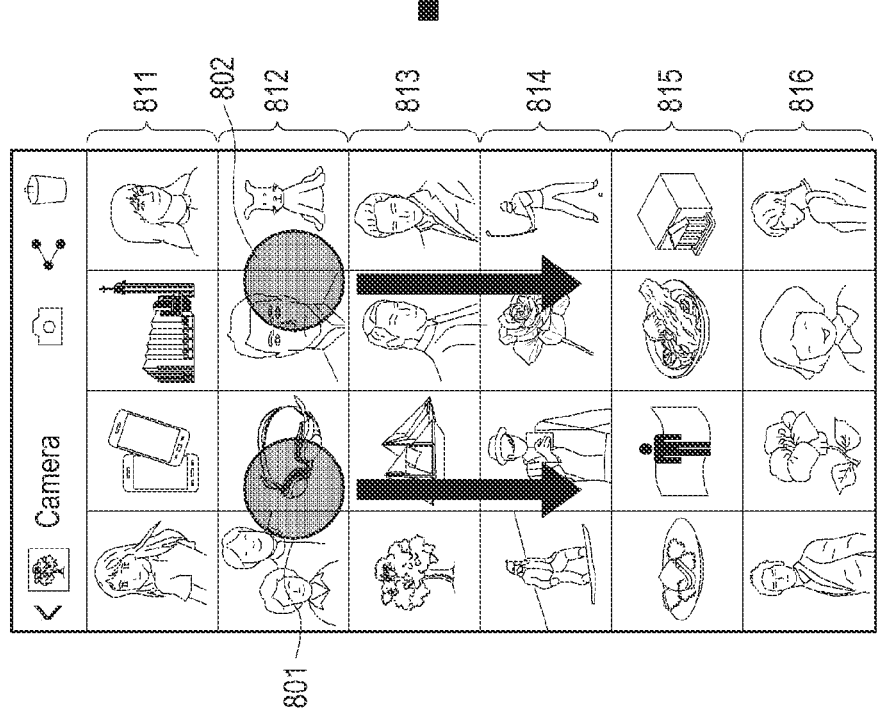

FIG. 8C illustrates a screen through which a user input for selecting a plurality of images is received, and FIG. 8D illustrates images selected according to the user input illustrated in FIG. 8C.

Referring to FIG. 8C, a user input for scrolling the screen downwards is entered while two arbitrary points 801 and 802 are selected. In addition, the user input extends from the first row 811 to the fourth row 814. Therefore, all images in the first to fourth rows 811 to 814 are selected as illustrated in FIG. 8D.

Figure 8F:
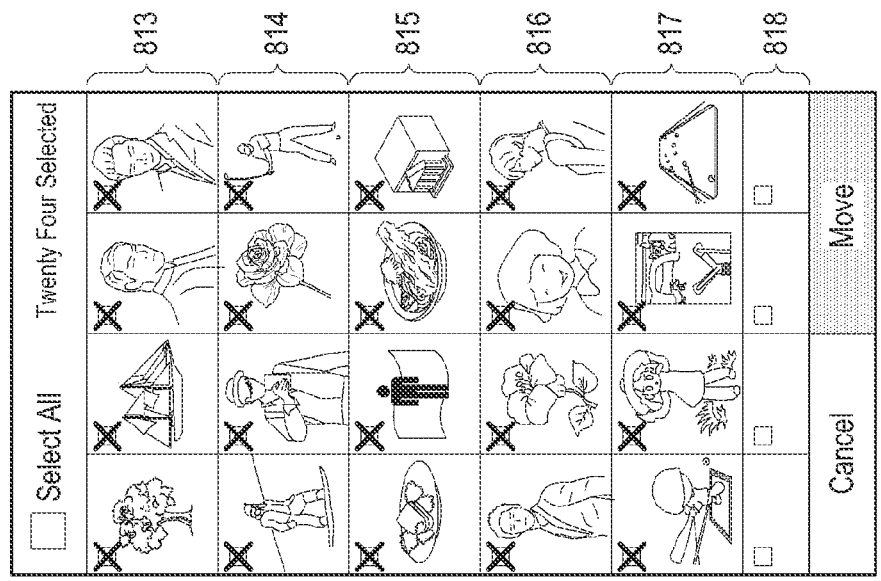
Figure 8E:
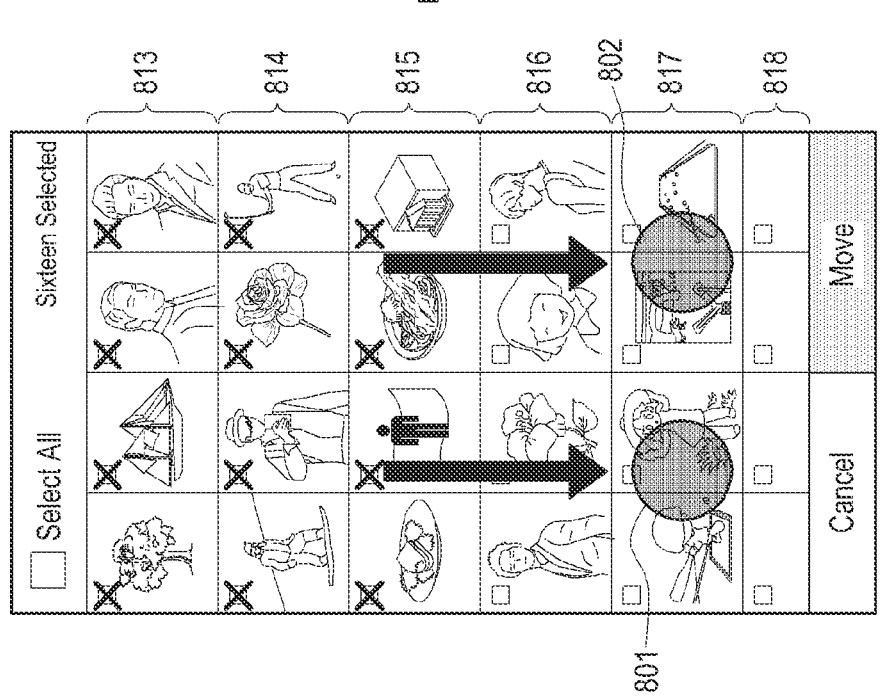

FIG. 8E illustrates a user input which is an extension of the user input illustrated in FIG. 8C, and FIG. 8F illustrates images selected according to the user input illustrated in FIG. 8C and FIG. 8E. The gallery is scrolled depending upon the scroll input (user input), and thus the images in the third to eighth rows 813 to 818 are displayed on the screen.

Referring to FIG. 8E, the user input for scrolling the screen downwards while the two arbitrary points 801 and 802 are selected, as illustrated in FIG. 8C, extends to the seventh row 817. Therefore all images in the first to seventh rows 811 to 817 are selected as illustrated in FIG. 8F.

Figures 8G, 8H:
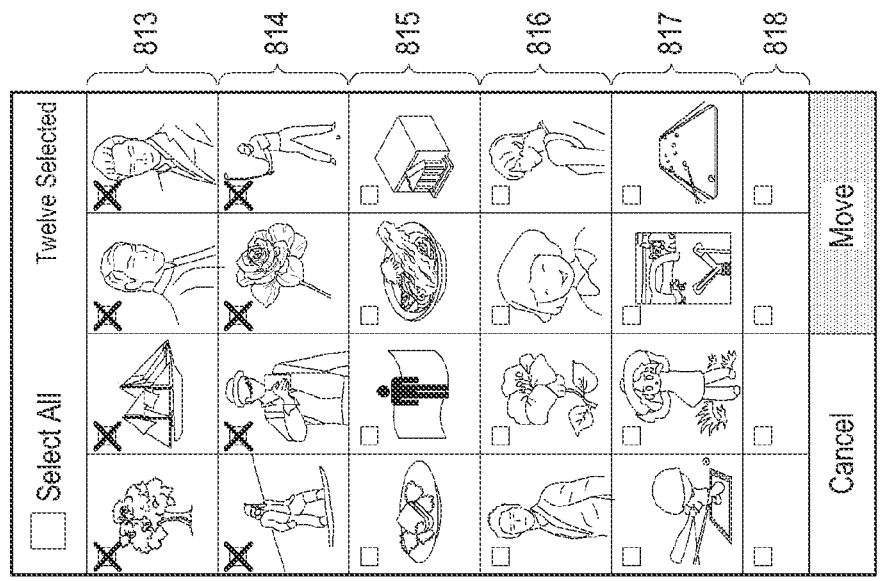

FIG. 8G illustrates a screen through which a user input (scroll input) for deselecting images is received while the images in the first to seventh rows 811 to 817 are selected, as illustrated in FIG. 8F and FIG. 8H illustrates a screen on which some of the items are deselected according to the user input for deselecting images.

Referring to FIG. 8G, a user input for scrolling the screen upwards while two arbitrary points 803 and 804 are selected extends from the seventh row 817 to the fifth row 815. Therefore, the images in the fifth to seventh rows 815 to 817 are deselected and only the images in the first to fifth rows 811 to 815 are selected as illustrated in FIG. 8H.

Figure 9B:
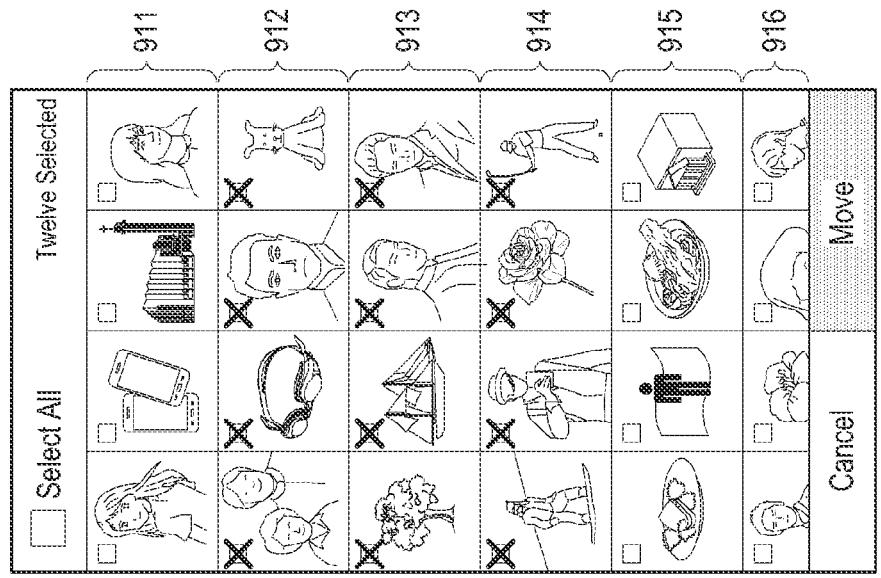
FIGS. 9A and 9B are diagrams illustrating screens on which an electronic device executes a multi-selection mode, according to an embodiment of the present invention.
Figure 9A:
Figure 9A:
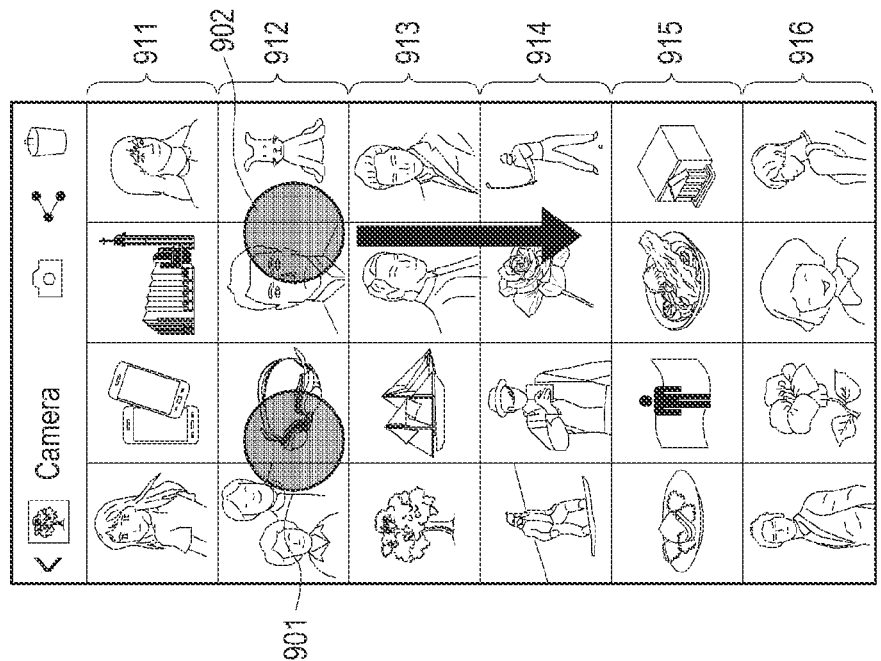

FIGS. 9A and 9B are diagrams illustrating screens on which an electronic device (e.g., the electronic device 101) executes a multi-selection mode, according to an embodiment of the present invention.

FIG. 9A illustrates a screen through which a user input for executing a multi-selection mode is entered, and FIG. 9B illustrates a screen on which the multi-selection mode is executed. Referring to FIGS. 9A and 9B, the display 150 displays a gallery containing images or icons corresponding thereto. There are four images in each of rows 911-916 of the gallery illustrated in FIGS. 9A and 9B.

Referring to FIG. 9A, a user input for executing a multi-selection mode may be a scroll input entered by arbitrarily selecting a first point 901 on a screen and then scrolling the screen downwards from a point other than the first point 901, for example, a second point 902. In this case, the first point 901 may be a fixed point on the screen and may also be located anywhere on the left side of the second point 902. In addition, a user may request the electronic device 101 to execute the multi-selection mode by scrolling the screen upwards or downwards from the second point 902. Furthermore, all items in a region where the scroll input passes over the screen may be selected.

FIG. 9B illustrates items selected according to the user input illustrated in FIG. 9A. The scroll input passes over the second to fourth rows 912 to 914 so that all items in the second to fourth rows 912 to 914 may be selected.

The screen control module 170 determines the coordinates of the first point 901. Assuming that a horizontal axis of the screen corresponds to the X axis and a vertical axis thereof corresponds to the Y axis, the screen control module 170 determines the X and Y coordinates of the first point 901. For example, the screen is assumed to have the X coordinate ranging from 0 to 840 and the Y coordinate ranging from 0 to 1280. In addition, the coordinates of the first point 901 is assumed to be (n1, n2). While the items 911 to 918 are scrolled downwards by the scroll input, the screen control module 170 may determine items having the same Y coordinate as the first point 901, as selected items. That is, the screen control module 170 determines that all items passing through the Y axis having a value of n2 are selected.

The screen control module 170 also determines that all items having the same Y coordinate as the first point 901 are deselected.

Figure 10B:
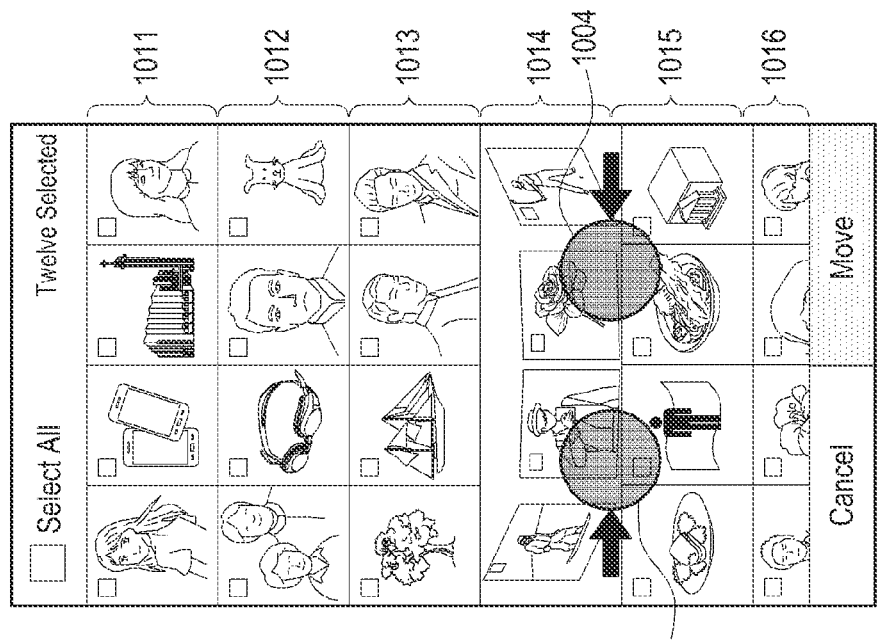
FIGS. 10A and 10B are diagrams illustrating screens on which an electronic device executes a multi-selection mode, according to an embodiment of the present invention.
Figure 10A:
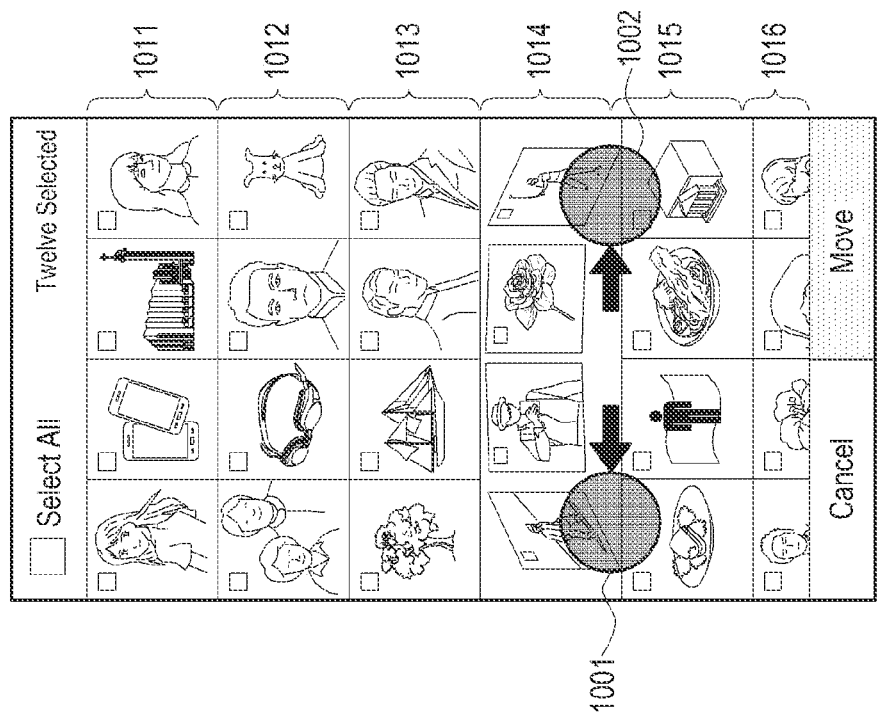

FIGS. 10A and 10B are diagrams illustrating screens on which an electronic device (e.g., the electronic device 101) executes a multi-selection mode, according to an embodiment of the present invention.

FIG. 10A illustrates a case in which a screen scroll speed is gradually increased, and FIG. 10B illustrates a case in which a screen scroll speed is gradually decreased. FIGS. 10A and 10B illustrate screens for displaying a gallery having images listed therein, and rows 1011 to 1016, each of which contains four images, are displayed thereon.

Referring to FIG. 10A, the distance between two points 1001 and 1002 at which a user input is received is gradually increased. When the distance between the two points 1001 and 1002 is increased, the screen control module 170 of the electronic device 101 deforms and displays items adjacent to the two points 1001 and 1002. For example, images in the fourth row 1014 may be displayed in the form of being bent inward. Therefore, the user can intuitively recognize that the screen scroll speed has been increased.

Referring to FIG. 10B, the distance between two points 1003 and 1004 at which a user input is received is gradually decreased. When the distance between the two points 1003 and 1004 is decreased, the screen control module 170 of the electronic device 101 also deforms and displays items adjacent to the two points 1003 and 1004. For example, the images in the fourth row 1014 may be displayed in the form of being bent outward. Therefore, the user can intuitively recognize that the screen scroll speed has been decreased.

Figure 11:
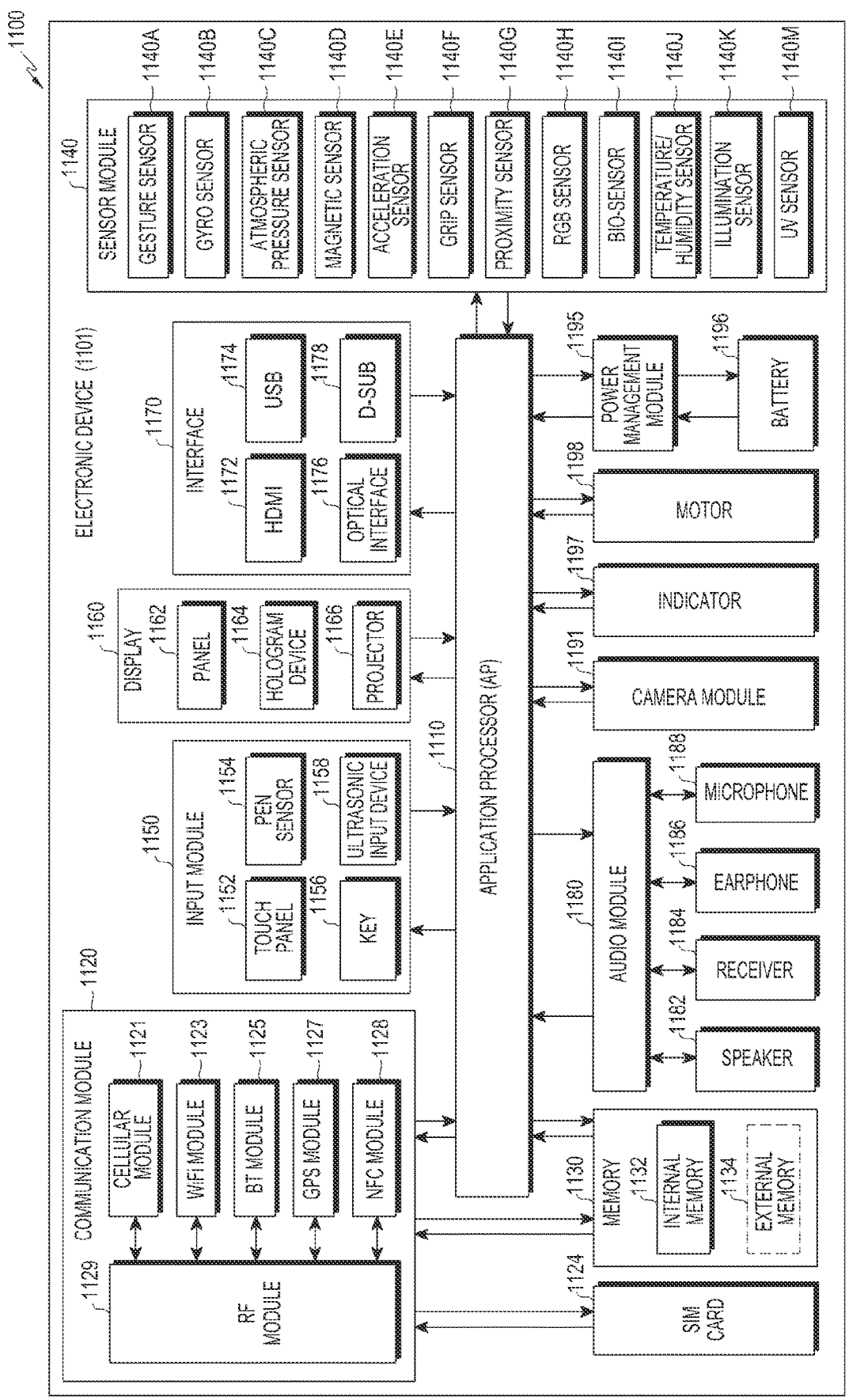
FIG. 11 is a block diagram of an electronic device according to an embodiment of the present invention.

FIG. 11 is a block diagram 1100 of an electronic device 1101, according to an embodiment of the present invention. The electronic device 1101 may constitute, for example, all or a part of the electronic device 101 illustrated in FIG. 1.

Referring to FIG. 11, the electronic device 1101 includes at least one Application Processor (AP) 1110, a communication module 1120, a Subscriber Identifier Module (SIM) card 1124, a memory 1130, a sensor module 1140, an input module 1150, a display 1160, an interface 1170, an audio module 1180, a camera module 1191, a power management module 1195, a battery 1196, an indicator 1197, and a motor 1198.

The AP 1110 controls a plurality of hardware or software components connected thereto by driving an operating system or an application program, process various types of data including multimedia data, and perform calculations. The AP 1110 may be embodied as, for example, a System on Chip (SoC). The AP 1110 may further include a Graphic Processing Unit (GPU).

The communication module 1120 (e.g., the communication interface 160) performs data transmission/reception in communication between the electronic device 1101 (e.g., the electronic device 101) and other electronic devices (e.g., the electronic device 104 or the server 106) connected thereto through a network. The communication module 1120 includes a cellular module 1121, a Wi-Fi module 1123, a BT module 1125, a GPS module 1127, an NFC module 1128, and a Radio Frequency (RF) module 1129.

The cellular module 1121 provides a voice call, a video call, a message service, or an Internet service through a communication network (e.g., LTE, LTE-A, CDMA, WCDMA, UMTS, WiBro, or GSM). In addition, the cellular module 1121 identifies and authenticates an electronic device in a communication network using, for example, a subscriber identification module (e.g., the SIM card 1124). The cellular module 1121 performs at least some functions which the AP 1110 can provide. For example, the cellular module 1121 performs at least a part of a multimedia control function.

The cellular module 1121 may include a Communication Processor (CP). In addition, the cellular module 1121 may be implemented by, for example, an SoC. Although the elements, such as the cellular module 1121 (e.g., the communication processor), the memory 1130, and the power management module 1195, are illustrated in FIG. 11 as being separated from the AP 1110, the AP 1110 may include at least some of the aforementioned elements (e.g., the cellular module 1121).

The AP 1110 or the cellular module 1121 (e.g., the communication processor) loads instructions or data, received from at least one of a non-volatile memory and other elements connected thereto, in a volatile memory and process the loaded instructions or data. In addition, the AP 1110 or the cellular module 1121 stores data received from or created by at least one of the other elements in a non-volatile memory.

The Wi-Fi module 1123, the BT module 1125, the GPS module 1127, and the NFC module 1128 may include, for example, a processor for processing data transmitted/received through the corresponding module. Although the cellular module 1121, the WiFi module 1123, the BT module 1125, the GPS module 1127, and the NFC module 1128 are illustrated as separate blocks in FIG. 11, at least some (for example, two or more) of them may be included in one Integrated Chip (IC) or one IC package. For example, at least some processors corresponding to the cellular module 1121, the Wi-Fi module 1123, the BT module 1125, the GPS module 1127, and the NFC module 1128, respectively, (e.g., a communication processor corresponding to the cellular module 1121 and a Wi-Fi processor corresponding to the Wi-Fi module 1123) may be implemented by a single SoC.

The RF module 1129 transmits/receives data, for example, an RF signal. Although not illustrated, the RF module 1129 may include, for example, a transceiver, a Power Amp Module (PAM), a frequency filter, or a Low Noise Amplifier (LNA). In addition, the RF module 1129 may further include a component, such as a conductor or a conductive wire, for transmitting/receiving an electromagnetic wave in a free space in wireless communication. Although the cellular module 1121, the Wi-Fi module 1123, the BT module 1125, the GPS module 1127, and the NFC module 1128 are illustrated as sharing one RF module 1129 in FIG. 11, at least one of them may transmit/receive the RF signal through a separate RF module.

The SIM card 1124 is a card including a subscriber identification module and is inserted into a slot formed in a particular portion of the electronic device. The SIM card 1124 includes unique identification information (e.g., Integrated Circuit Card Identifier (ICCID)) or subscriber information (e.g., International Mobile Subscriber Identity (IMSI)).

The memory 1130 (e.g., the memory 130) includes an internal memory 1132 and an external memory 1134. The internal memory 1132 may include at least one of a volatile memory (e.g., a Dynamic Random Access Memory (DRAM), a Static RAM (SRAM), and a Synchronous Dynamic RAM (SDRAM)) and a non-volatile memory (e.g., a One Time Programmable Read Only Memory (OT-PROM), a Programmable ROM (PROM), an Erasable and Programmable ROM (EPROM), an Electrically Erasable and Programmable ROM (EEPROM), a mask ROM, a flash ROM, a NAND flash memory, and a NOR flash memory).

The internal memory 1132 may be a Solid State Drive (SSD). The external memory 1134 may further include a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 1134 may be functionally connected to the electronic device 1101 through various interfaces. The electronic device 1101 may further include a storage device (or storage medium) such as a hard drive.

The sensor module 1140 measures a physical quantity or detects an operating state of the electronic device 1101 and converts the measured or detected information into an electronic signal. The sensor module 1140 includes at least one of, for example, a gesture sensor 1140A, a gyro sensor 1140B, an atmospheric pressure sensor 1140C, a magnetic sensor 1140D, an acceleration sensor 1140E, a grip sensor 1140F, a proximity sensor 1140G, a color sensor 1140H (e.g., Red, Green, and Blue (RGB) sensor), a biometric sensor 1140I, a temperature/humidity sensor 1140J, an illumination sensor 1140K, and an Ultra Violet (UV) sensor 1140M. Additionally or alternatively, the sensor module 1140 may include, for example, an E-nose sensor, an ElectroMyoGraphy (EMG) sensor, an ElectroEncephaloGram (EEG) sensor, an ElectroCardioGram (ECG) sensor, an Infrared (IR) sensor, an iris sensor, or a fingerprint sensor. The sensor module 1140 may further include a control circuit for controlling at least one sensor included therein.

The input module 1150 includes a touch panel 1152, a (digital) pen sensor 1154, a key 1156, and an ultrasonic input device 1158. The touch panel 1152 recognizes a touch input that is at least one of, for example, a capacitive type, a resistive type, an infrared type, and an ultrasonic type. The touch panel 1152 may further include a control circuit. In the case of the capacitive type touch panel, physical contact or proximity recognition is possible. The touch panel 1152 may further include a tactile layer. In this case, the touch panel 1152 may provide a tactile reaction to a user.

The (digital) pen sensor 1154 may be implemented, for example, using the same or similar method to receiving a user's touch input or using a separate recognition sheet.

The key 1156 may include, for example, a physical button, an optical key or a keypad.

The ultrasonic input device 1158 is a device which detects an acoustic wave using a microphone 1188 in the electronic device 1101 through an input unit generating an ultrasonic signal to identify data, and the input device 1158 performs wireless recognition. The electronic device 1101 also receives a user input from an external device (e.g., a computer or a server) connected thereto using the communication module 1120.

The display 1160 (e.g., the display 150) includes a panel 1162, a hologram device 1164, and a projector 1166. The panel 1162 may be, for example, a Liquid Crystal Display (LCD) or Active-Matrix Organic Light Emitting Diode (AM-OLED). The panel 1162 may be, for example, flexible, transparent, or wearable. The panel 1162 may also be configured as one module together with the touch panel 1152.

The hologram device 1164 shows a stereoscopic image in the air using interference of light.

The projector 1166 projects light onto a screen to display an image. For example, the screen may be located inside or outside the electronic device 1101. The display 1160 may further include a control circuit for controlling the panel 1162, the hologram device 1164, or the projector 1166.

The interface 1170 includes, for example, a High-Definition Multimedia Interface (HDMI) 1172, a Universal Serial Bus (USB) 1174, an optical interface 1176, or a D-subminiature (D-sub) 1178. The interface 1170 may be included in, for example, the communication interface 160 illustrated in FIG. 1. Additionally or alternatively, the interface 1170 may include, for example, a Mobile High-definition Link (MHL) interface, a Secure Digital (SD) card/Multi-Media Card (MMC) interface, or an Infrared Data Association (IrDA) standard interface.

The audio module 1180 bilaterally converts a sound and an electronic signal. At least some elements of the audio module 1180 may be included in, for example, the input/output interface 140 illustrated in FIG. 1. The audio module 1180 processes voice information input or output through, for example, a speaker 1182, a receiver 1184, earphones 1186, or the microphone 1188.

The camera module 1191 is a device for capturing a still image and a video. The camera module 291 may include one or more image sensors (e.g., a front or rear sensor), a lens, an Image Signal Processor (ISP) or a flash (e.g., an LED or xenon lamp).

The power management module 1195 manages electric power of the electronic device 1101. Although not illustrated, the power management module 1195 may include, for example, a Power Management Integrated Circuit (PMIC), a charger Integrated Circuit (IC), or a battery gauge.

The PMIC may be mounted to, for example, an integrated circuit or an SoC semiconductor. Charging methods may be classified into a wired charging method and a wireless charging method. The charger IC charges a battery and prevents over voltage or over current from a charger. The charger IC may include a charger IC for at least one of the wired charging method and the wireless charging method. Examples of the wireless charging method include a magnetic resonance type, a magnetic induction type, or an electromagnetic wave type, and an additional circuit for wireless charging, such as a coil loop circuit, a resonance circuit, or a rectifier circuit may be added.

The battery gauge measures, for example, a residual quantity of the battery 1196, or a voltage, a current, or a temperature during the charging. The battery 1196 stores or generates electricity and supply power to the electronic device 1101 using the stored or generated electricity. The battery 1196 may include, for example, a rechargeable battery or a solar battery.

The indicator 1197 displays a particular status of the electronic device 1101 or some parts thereof (e.g., the AP 1110), for example, a booting status, a message status, or a charging status. The motor 1198 converts an electrical signal into mechanical vibration. Although not illustrated, the electronic device 1101 may include a processing unit (e.g., GPU) for supporting a mobile TV. The processing unit processes media data according to a standard, such as Digital Multimedia Broadcasting (DMB), Digital Video Broadcasting (DVB), or media flow.

The aforementioned elements of the electronic device 1100 may be constituted by one or more components, and the names of corresponding elements may vary with a type of electronic device.

The electronic device 1100 may include at least one of the aforementioned elements. Some elements may be omitted or other additional elements may be further included in the electronic device. In addition, a single entity constituted by combining some elements of the electronic device may equivalently perform functions of the corresponding elements prior to the combination thereof.

Figure 12:
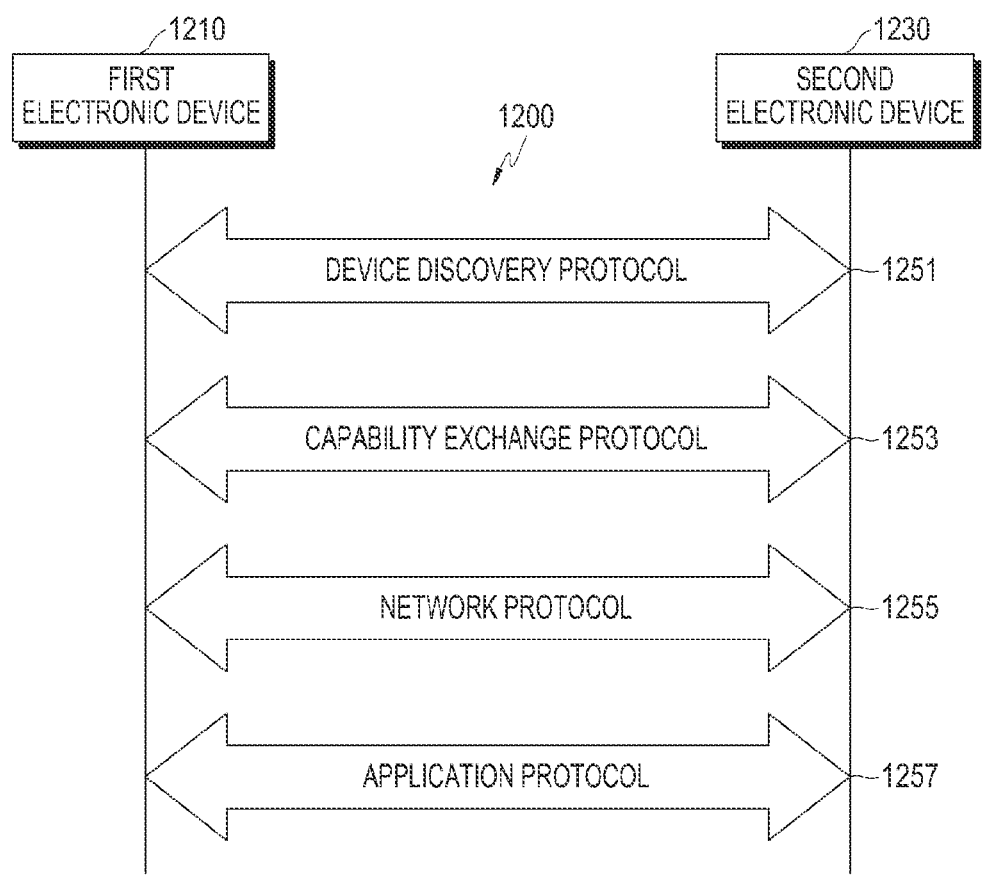
FIG. 12 is a signaling diagram illustrating a communication protocol between a plurality of electronic devices, according to an embodiment of the present invention.

FIG. 12 is a signaling diagram illustrating a communication protocol 1200 between a plurality of electronic devices (e.g., an electronic device 1210 and an electronic device 1230), according to an embodiment of the present invention.

Referring to FIG. 12, a communication protocol 1200 may include, for example, a device discovery protocol 1251, a capability exchange protocol 1253, a network protocol 1255, and an application protocol 1257.

The device discovery protocol 1251 may be a protocol that allows the electronic devices 1210, 1230 to detect an external electronic device capable of communicating therewith or connect the detected external electronic device thereto. For example, the electronic device 1210 (e.g., the electronic device 101) may detect the electronic device 1230 (e.g., the electronic device 104), as a device which can communicate therewith, through a communication method (e.g., Wi-Fi, BT, or USB) which can be used in the electronic device 1210, using the device discovery protocol 1251. For communication with the electronic device 1230, the electronic device 1210 acquires and stores identification information on the detected electronic device 1230 using the device discovery protocol 1251. For example, the electronic device 1210 establishes the communication with the electronic device 1230, based on the identification information.

The device discovery protocol 1251 may be a protocol for mutual authentication between a plurality of electronic devices. For example, the electronic device 1210 performs authentication between the electronic device 1210 and the electronic device 1230, based on communication information (e.g., a Media Access Control (MAC) address, a Universally Unique IDentifier (UUID), a SubSystem IDentification (SSID), and an Information Provider address) for connection with the electronic device 1230.

The capability exchange protocol 1253 may be a protocol for exchanging information related to a service function which can be supported by at least one of the electronic device 1210 and the electronic device 1230. For example, the electronic device 1210 and the electronic device 1230 may mutually exchange information related to currently provided service functions through the capability exchange protocol 1253. The exchangeable information may include identification information indicating a particular service among a plurality of services which can be supported by the electronic device 1210 or the electronic device 1230. For example, the electronic device 1210 receives identification information of a particular service, provided by the electronic device 1230, from the electronic device 1230 through the capability exchange protocol 1253. In this case, the first electronic device 1210 determines whether the electronic device 1210 supports the particular service, based on the received identification information.

The network protocol 1255 may be a protocol for controlling flow of data transmitted/received to provide a service between the electronic devices 1210, 1230, which are connected to communicate with each other. For example, at least one of the electronic device 1210 and the electronic device 1230 controls an error or data quality using the network protocol 1255. Additionally or alternatively, the network protocol 1255 determines a transmission format of data transmitted/received between the electronic device 1210 and the electronic device 1230. In addition, using the network protocol 1255, at least one of the electronic device 1210 and the electronic device 1230 performs session management (e.g., session connection or session termination) for data exchange between the electronic devices.

The application protocol 1257 may be a protocol for providing a procedure or information for exchanging data related to a service provided to an external electronic device. For example, the electronic device 1210 (e.g., the electronic device 101) provides a service to the electronic device 1230 (e.g., the electronic device 104 or the server 106) through the application protocol 1257.

The communication protocol 1200 may include a standard communication protocol, a communication protocol designated by an individual or organization (e.g., a communication protocol self-designated by a communication device maker or a network provider) or a combination thereof.

The term "module" used in the embodiments of the present invention may refer to, for example, a unit including one or more combinations of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" a may include at least one of an Application-Specific Integrated Circuit (ASIC) chip, a Field-Programmable Gate Arrays (FPGA), and a programmable-logic device for performing operations which are known or may be developed hereinafter.

At least part of a device (for example, modules or functions thereof) or a method (for example, operations) may be embodied by, for example, an instruction stored in a computer readable storage medium provided in a form of a programming module. When the instruction is performed by at least one processor (for example, the processor 120), the at least one processor may perform a function corresponding to the instruction. The computer-readable storage medium may be, for example, the memory 130. At least some of the programming modules may be implemented (for example, executed) by, for example, the processor 120. At least a part of the programming module may include, for example, a module, a program, a routine, a set of instructions and/or a process for performing one or more functions.

The computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, programming module), such as a Read Only Memory (ROM), a Random Access Memory (RAM), a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present invention, and vice versa.

A module or a programming module according to the present invention may include at least one of the described component elements, a few of the component elements may be omitted, or additional component elements may be included. Operations executed by a module, a programming module, or other component elements may be executed sequentially, in parallel, repeatedly, or in a heuristic manner.

Furthermore, some operations may be executed in a different order or may be omitted, or other operations may be added.

While the present invention has been shown and described with reference to certain embodiments thereof, it should be understood by those skilled in the art that many variations and modifications of the method and apparatus described herein will still fall within the spirit and scope of the present invention as defined in the appended claims and their equivalents.

What is claimed is:

1. A method of controlling an electronic device, the method comprising:
   displaying a first set of items among a plurality of items on a screen by rows and columns;
   detecting a user input for entering a multiple selection mode without selecting an item among the plurality of items;
   while in the multiple selection mode, detecting a first touch input on a first item on a first row of the first set of items on the screen, and selecting the first item in response to the first touch input being detected after entering the multiple selection mode;
   while in the multiple selection mode, detecting that the first touch input is moved from the selected first item on the first row to a second item on a third row through a second row of the first set of items; and
   while in the multiple selection mode, as a response to identifying that the first touch input is moved from the first row to the third row, selecting all of the items arranged in the second row of the first set of items passed over by the first touch input, the all of the items including at least one touched item arranged in the second row of the first set of items, and at least one untouched item arranged in the second row of the first set of items,
   wherein the first touch input is a user input moving in one of up and down.

2. The method of claim 1, further comprising, after receiving the moving of the first touch input:
   receiving a second touch input; and
   in response to a moving of the second touch input, deselecting one or more of the selected at least one touched item, the selected first item, the selected at least one untouched item, and the selected second item.

3. The method of claim 2, wherein the moving of the second touch input is in an opposite direction to the moving of the first touch input.

4. The method of claim 1, further comprising:
   processing the selected at least one touched item, the selected at least one untouched item, and the selected second item according to an input for processing the selected at least one touched item, the selected first item, the selected at least one untouched item, and the selected second item, the input being received through the display.

5. The method of claim 1, further comprising:
   displaying checked select boxes corresponding to each of the at least one touched item, the selected at least one untouched item, and the selected second item.

6. The method of claim 1, wherein the first touch input is a hovering input.

7. The method of claim 1, further comprising:
   while in the multiple selection mode, displaying an additional row of items arranged after the first set of items among the plurality of items by scrolling the screen based on the moving of the first touch input on the first set of items; and
   while in the multiple selection mode, based on a first position of the first touch input being on a third item in the additional row of items, selecting the touched third item in the additional row of items, wherein the first touch input is a continuous dragging input which starts from the selected first item and ends in the third item being displayed by the scrolling the screen.

8. The method of claim 7, wherein scrolling the screen based on the moving of the first touch input on the first set of items further comprises dragging the first touch input from a first position on the first set of items to a second position on the additional row of items.

9. The method of claim 1, further comprising:
   based on receiving a third input for deleting, deleting selected items and images corresponding to the selected items among the plurality of items, wherein the selected items include the selected first item, the selected at least one touched item, the selected at least one untouched item, and the selected second item.

10. An electronic device, comprising:
    a display;
    a processor; and
    memory storing instructions that, when executed by the processor, cause the electronic device to:
    control the display to display a first set of items among a plurality of items on a screen by rows and columns,
    detect a user input for entering a multiple selection mode without selecting an item among the plurality of items,
    while in the multiple selection mode, detect a first touch input on a first item on a first row of the first set of items on the screen and select the first item in response to the first touch input being detected after entering the multiple selection mode,
    while in the multiple selection mode, detect that the first touch input is moved from the selected first item on the first row to a second item on a third row through a second row of the first set of items, and
    while in the multiple selection mode, as a response to identifying that the first touch input is moved from the first row to the third row of the first set of items on the screen, select all of the items arranged in the second row of the first set of items, the all of the items including at least one touched item arranged in the second row of the first set of items, and at least one untouched item arranged in the second row of the first set of items,
    wherein the first touch input is a user input moving in one of up and down.

11. The electronic device of claim 10, wherein the instructions further cause the electronic device to, after receiving the moving of the first touch input:
    receive a third touch input, and
    in response to a moving of the third touch input, deselect one or more of the selected at least one touched item, the selected first item, the selected at least one untouched item, and the selected second item.

12. The electronic device of claim 11, wherein the moving of the third touch input is in an opposite direction to the moving of the first touch input.

13. The electronic device of claim 10, wherein the instructions further cause the electronic device to process the selected at least one touched item, the selected at least one untouched item, and the selected second item according to an input for processing the selected at least one touched item, the selected first item, the selected at least one untouched item, and the selected second item, the input being received through the display.

14. The electronic device of claim 10, wherein the instructions further cause the electronic device to control the display to display checked select boxes corresponding to each of the at least one touched item, the selected at least one untouched item, and the selected second item.

15. The electronic device of claim 10, wherein the first touch input is a hovering input.

16. The electronic device of claim 10, wherein the instructions further cause the electronic device to:
while in the multiple selection mode, display an additional row of items arranged after the first set of items among the plurality of items by scrolling the screen based on the moving of the first touch input on the first set of items; and
while in the multiple selection mode, based on a first position of the first touch input being on a third item in the additional row of items, select the touched third item in the additional row of items, wherein the first touch input is a continuous dragging input which starts from the selected first item and ends in the third item being displayed by the scrolling the screen.

17. The electronic device of claim 16, wherein the instructions further cause the electronic device to:
drag the first touch input from a first position on the first set of items to a second position on the additional row of items.

18. The electronic device of claim 10, wherein the instructions further cause the electronic device to:
based on receiving a third input for deleting, delete selected items and images corresponding to the selected items among the plurality of items, wherein the selected items include the selected first item, the selected at least one touched item, the selected at least one untouched item, and the selected second item.

19. A non-transitory computer-readable storage medium storing commands, wherein the commands are configured to be executed by at least one processor to command the at least one processor to perform at least one operation, the at least one operation comprising:
displaying, on a display, a first set of items among a plurality of items on a screen by rows and columns;
detecting a user input for entering a multiple selection mode without selecting an item among the plurality of items;
while in the multiple selection mode, detecting a first touch input on a first item on a first row of the first set of items on the screen while displaying the first set of items and selecting the first item in response to the first touch input being detected after entering the multiple selection mode;
while in the multiple selection mode, detecting that the first touch input is moved from the selected first item on the first row to a second item on a third row through a second row of the first set of items; and
while in the multiple selection mode, as a response to identifying that the first touch is moved from the first row to the third row, selecting all of the items arranged in the second row of the first set of items passed over by the first touch input, the all of the items including at least one touched item arranged in the second row of the first set of items, and at least one untouched item arranged in the second row of the first set of items,
wherein the first touch input is a user input moving in one of up and down.

* * * * *